(12) United States Patent
Kim et al.

(10) Patent No.: US 12,445,581 B2
(45) Date of Patent: Oct. 14, 2025

(54) PROJECTOR DEVICE AND METHOD FOR CONTROLLING THE SAME

(71) Applicant: SAMSUNG ELECTRONICS CO., LTD., Suwon-si (KR)

(72) Inventors: Jiman Kim, Suwon-si (KR); Sehyeok Park, Suwon-si (KR); Sungwon Seo, Suwon-si (KR); Seongwoon Jung, Suwon-si (KR); Mirae Shin, Suwon-si (KR); Sangmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 423 days.

(21) Appl. No.: 18/112,098

(22) Filed: Feb. 21, 2023

(65) Prior Publication Data
US 2023/0388463 A1    Nov. 30, 2023

Related U.S. Application Data

(63) Continuation of application No. PCT/KR2023/001292, filed on Jan. 27, 2023.

(30) Foreign Application Priority Data

May 26, 2022  (KR) .................. 10-2022-0064961
Aug. 5, 2022   (KR) .................. 10-2022-0097993

(51) Int. Cl.
*H04N 9/31* (2006.01)
(52) U.S. Cl.
CPC ......... *H04N 9/3147* (2013.01); *H04N 9/3185* (2013.01)

(58) Field of Classification Search
CPC .......................... H04N 9/3147; H04N 9/3185
See application file for complete search history.

(56) References Cited

U.S. PATENT DOCUMENTS 6,804,406 B1   10/2004  Chen
10,375,386 B2   8/2019  Sugiura
(Continued)

FOREIGN PATENT DOCUMENTS

CN    113281951    8/2021
JP    2005-148298  6/2005
(Continued)

OTHER PUBLICATIONS

Search Report and Written Opinion dated May 3, 2023 issued in International Patent Application No. PCT/KR2023/001292.
(Continued)

*Primary Examiner* — Bao-Luan Q Le
(74) *Attorney, Agent, or Firm* — Nixon & Vanderhye, P.C.

(57) ABSTRACT

The disclosure relates to a projector device and a method for controlling the same. A master projector device according to an embodiment may obtain first sensing information through a visible light sensor, obtain second sensing information through an invisible light sensor, generate a positional relationship with a slave projector device based on the first sensing information and the second sensing information, and control a positional relationship of the slave projector device based on the generated positional relationship and a coordinate value of an invisible indicator identified by the invisible light sensor while projecting an image stored in a memory to a projection surface.

15 Claims, 22 Drawing Sheets

(56) References Cited

U.S. PATENT DOCUMENTS

| | | | |
|---|---|---|---|
| 11,399,165 B2 | 7/2022 | Fuchikami | |
| 2007/0188719 A1 | 8/2007 | Jaynes et al. | |
| 2008/0246781 A1* | 10/2008 | Surati | H04N 9/3194 345/581 |
| 2012/0086915 A1* | 4/2012 | Rosen | H04N 9/3147 353/30 |
| 2013/0100009 A1* | 4/2013 | Willis | H04N 9/3147 345/156 |
| 2013/0222386 A1 | 8/2013 | Tannhauser et al. | |
| 2013/0229396 A1* | 9/2013 | Huebner | G06F 3/1446 345/207 |
| 2018/0091787 A1 | 3/2018 | Kursula et al. | |
| 2018/0164670 A1* | 6/2018 | Kaji | H04N 9/3194 |
| 2018/0191990 A1* | 7/2018 | Motoyama | G06F 3/0304 |
| 2018/0300017 A1* | 10/2018 | Wakimoto | G06F 3/0421 |
| 2019/0028685 A1* | 1/2019 | Kaji | G06T 7/74 |
| 2019/0075287 A1 | 3/2019 | Kilcher et al. | |
| 2020/0128219 A1* | 4/2020 | Katsuki | G06T 7/521 |
| 2020/0329220 A1* | 10/2020 | Kaji | H04N 9/3185 |
| 2021/0235052 A1* | 7/2021 | Fuchikami | H04N 9/3185 |
| 2021/0243416 A1* | 8/2021 | Fuchikami | H04N 9/3185 |
| 2021/0274139 A1* | 9/2021 | Fuchikami | H04N 9/3194 |

FOREIGN PATENT DOCUMENTS

| | | |
|---|---|---|
| JP | 2009-200613 | 9/2009 |
| JP | 2009-284135 | 12/2009 |
| JP | 2014-219572 | 11/2014 |
| JP | 2016-133556 | 7/2016 |
| JP | 2017-083550 | 5/2017 |
| JP | 2018-207373 | 12/2018 |
| JP | 2019-201363 | 11/2019 |
| JP | 2020-178248 | 10/2020 |
| JP | 2021-132299 | 9/2021 |
| KR | 10-2018-0040230 | 4/2018 |

OTHER PUBLICATIONS

Extended European Search Report dated Mar. 5, 2025 issued in European Patent Application No. 23811934.1.

* cited by examiner

PROJECTOR DEVICE AND METHOD FOR CONTROLLING THE SAME

CROSS-REFERENCE TO RELATED APPLICATIONS

This application is a continuation of International Application No. PCT/KR2023/001292 designating the United States, filed on Jan. 27, 2023, in the Korean Intellectual Property Receiving Office, which claims priority from Korean Patent Application Nos. 10-2022-0064961, filed on May 26, 2022, and 10-2022-0097993, filed on Aug. 5, 2022, in the Korean Intellectual Property Office, the disclosures of all of which are incorporated by reference herein in their entireties.

BACKGROUND

Field

The disclosure relates to a projector device and a method for controlling the same.

Description of Related Art

A display device is a device for outputting images and may display image data through a display panel. The display device cannot output an image in a size outside its designed dimension range, and furthermore, is difficult to implement to have a large screen.

As another image output device, a projector device is used. The projector device projects an image to a projection surface (e.g., screen), displaying the image emitted from a light source on the screen. The projector device may output images in a wider range in a distance farther from the projection screen. However, as the distance increases, the resolution and the brightness or contrast ratio (CR) may deteriorate—namely, display quality may decrease. Thus, it is common to place and use the projector device in an appropriate position.

In a case where two or more projector devices project an image in conjunction with each other, if a positional relationship of any one of the two projector devices changed, a distorted image may be output.

SUMMARY

Embodiments of the disclosure provide a projector device that reduces a difference in brightness between an overlapping area and a non-overlapping area of two projection areas when projecting an image in conjunction with another projector device.

Embodiments of the disclosure provide a projector device that may detect distortion output and restore it to the original positional relationship.

According to an example embodiment, a master projector device comprises: a visible light sensor configured to detect a visible light wavelength band, an invisible light sensor configured to detect an invisible light wavelength band, at least one transceiver configured to communicate with a slave projector device, a memory including a program including at least one instruction, and at least one processor electrically connected with the visible light sensor, the invisible light sensor, the at least one transceiver, and the memory and configured to execute the at least one instruction of the program. In an embodiment, the processor may be configured to: obtain first sensing information obtained through the visible light sensor. In an embodiment, the processor may obtain second sensing information through the invisible light sensor. In an embodiment, the processor may generate a positional relationship with a slave projector device based on the first sensing information and the second sensing information. In an embodiment, the processor may control a projection direction and projection range of the slave projector device based on the generated positional relationship and the second sensing information (e.g., the coordinate value of an invisible indicator identified while projecting the image after generating the positional relationship) identified by the invisible light sensor while projecting an image stored in the memory to a projection surface.

In an example embodiment, the master projector device may include a projector and an emitter. In an embodiment, the projector may be configured to project an image in a visible light band onto the first projection area. In an embodiment, the emitter may be configured to emit an invisible indicator of the invisible light band to be included in the first projection area.

In an example embodiment, the positional relationship may include a homography matrix. In an example embodiment, the processor may be configured to: project a visible indicator onto the first projection area using the projector. In an embodiment, the processor may control the slave projector device to project a visible indicator onto the second projection area.

In an example embodiment, the processor may be configured to: generate a relationship matrix related to the first and second projection areas. In an embodiment, the processor may generate the homography matrix by associating the coordinate value of the invisible indicator identified by the invisible light sensor in the second projection area with the relationship matrix.

In an example embodiment, the processor may be configured to: project a visible indicator onto the first projection area using the projector. In an embodiment, the processor may control the slave projector device to project a visible indicator onto the second projection area. In an embodiment, the processor may generate first relationship information based on positions of visible indicators identified by the visible light sensor in the first projection area and the second projection area. In an embodiment, the processor may generate second relationship information by associating a position of the invisible indicator identified by the invisible light sensor to the first relationship information in at least one of the first projection area or the second projection area. In an embodiment, the second relationship information may be configured of at least a portion of the location relationship. In an embodiment, the relationship information is information associated with the positional relationship, and may include, e.g., a homography matrix, but is not limited thereto. In an embodiment, relationship information may be used interchangeably with the term "location relationship".

In an example embodiment, a field of view of the projector may be set to be smaller than the field of view of the visible light sensor.

In an example embodiment, the field of view of the projector may be set to be smaller than the field of view of the invisible light sensor.

In an example embodiment, the emitter may be configured to emit light in a wavelength band of at least one of ultraviolet, near ultraviolet, infrared, and near infrared light.

In an example embodiment, the first sensing information may include a coordinate value regarding a plurality of visible indicators projected by the projector.

In an example embodiment, the second sensing information may include a coordinate value regarding a plurality of invisible indicators projected by the emitter.

In an example embodiment, the processor may be configured to identify an overlap area included in the first projection area using the visible light sensor. In an example embodiment, grayscale in the overlap area may be changed in gradations.

In an example embodiment, the processor may be configured to: identify an overlap area included in the first projection area using the visible light sensor. In an embodiment, the processor may change the grayscale of a filling area including the overlapping area into a specified grayscale value. In an embodiment, the processor may change the gray levels in at least two areas adjacent to the overlap area in gradations outward.

According to an example embodiment, a master projector device comprises: a projector configured to output a visible indicator and an image, an emitter configured to emit an invisible indicator, a visible light sensor configured to identify the visible indicator, an invisible light sensor configured to identify the invisible indicator, at least one transceiver configured to communicate with a slave projector device, a memory including a program including at least one instruction, and at least one processor electrically connected with the projector, the emitter, the visible light sensor, the invisible light sensor, the at least one transceiver, and the memory and executing the at least one instruction of the program. In an example embodiment, the processor may be configured to: identify the invisible indicator emitted to at least a partial area of a projection surface corresponding to a second field of view through the invisible light sensor having the second field of view while projecting an image stored in the memory to the projector having a first field of view. In an example embodiment, the processor may be configured to control a projection direction and projection range of the slave projector device based on a coordinate value of the identified invisible indicators.

In an example embodiment, the field of view of the projector may be set to be smaller than the field of view of the visible light sensor.

In an example embodiment, the field of view of the projector may be set to be smaller than the field of view of the invisible light sensor.

In an example embodiment, the processor may be configured to compare the coordinate value of the identified invisible indicators with a specified homography matrix. In an example embodiment, the processor may be configured to control the projection direction and projection range of the slave projector device so that the coordinate value of the identified invisible indicators has a difference less than a specified threshold from the homography matrix.

In an example embodiment, the processor may be configured to project a visible indicator onto the first projection area using the projector. In an embodiment, the processor may control the slave projector device to project a visible indicator onto the second projection area. In an embodiment, the processor may generate first relationship information based on positions of visible indicators identified by the visible light sensor in the first projection area and the second projection area. In an embodiment, the processor may generate second relationship information by associating a position of the invisible indicator identified by the invisible light sensor to the first relationship information in at least one of the first projection area or the second projection area. In an embodiment, the second relationship information may be configured of at least a portion of the location relationship.

In an example embodiment, the processor may be configured to control the projector to output only the invisible indicator, of the visible indicator and the invisible indicator, while outputting the image.

Without limitations thereto, a method for controlling an electronic device (e.g., a master projector device or a user equipment (UE)) according to an example embodiment comprises: obtaining first sensing information through the visible light sensor, obtaining second sensing information through the invisible light sensor, generating a positional relationship with a slave projector device based on the first sensing information and the second sensing information, and controlling the projection direction and projection range of the slave projector device based on the generated positional relationship and the coordinate value of an invisible indicator identified by the invisible light sensor while projecting an image stored in the memory to a projection surface.

Without limitations thereto, a method for controlling an electronic device (e.g., a master projector device or a user equipment (UE)) according to an example embodiment comprises: emitting the invisible indicator onto the first projection area while projecting an image stored in the memory to a specified first projection area and controlling the projection direction and projection range of the slave projector device based on the coordinate value of the identified invisible indicators on the first projection area.

A non-transitory computer-readable recording medium (CRM) according to an example embodiment may have recorded thereon one or more instructions which, when executed by at least one processor included in an electronic device (e.g., a master projector device, a slave projector device, or a UE) or another electronic device coupled with the electronic device, cause the electronic device to perform operations of the above-described electronic device and operations of the control method.

When the projector device according to various example embodiments of the disclosure projects an image in conjunction with another projector device, the area in which two projection areas by the respective projector devices overlap is rendered to have grayscale changes in gradations, reducing the difference in brightness between the overlapping area and the non-overlapping area.

Further, the projector device according to various example embodiments may detect a change in the positional relationship with the corresponding projector device or another interworking projector device through various sensors or cameras and gradually restore to the original positional relationship based on a pre-stored positional relationship.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Figure 1:
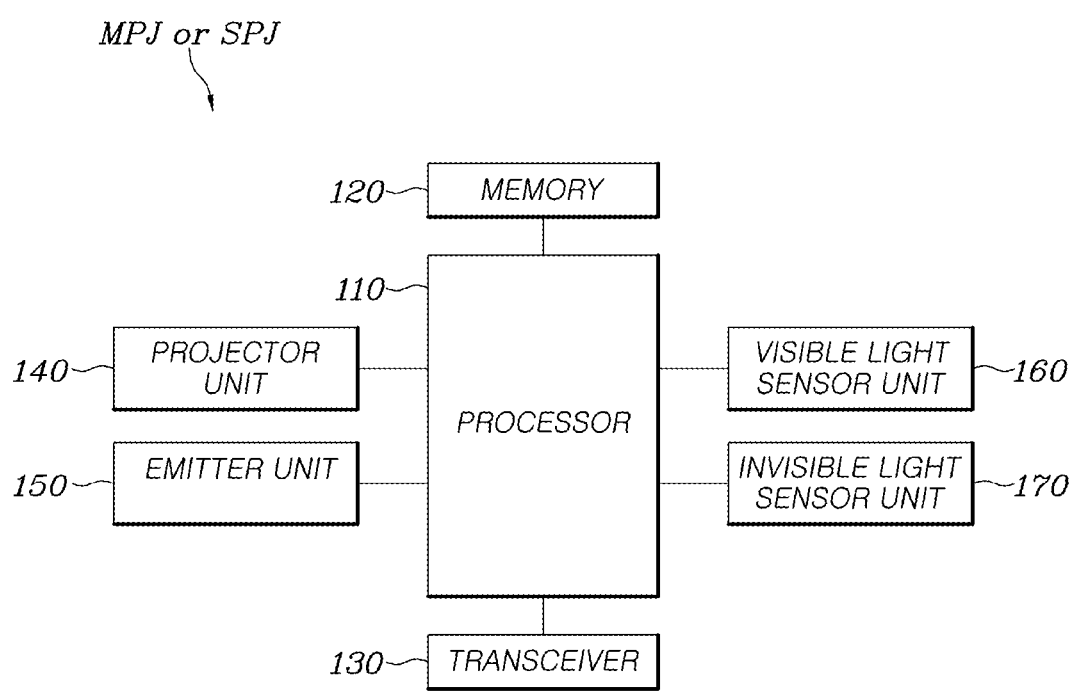
FIG. 1 is a block diagram illustrating an example configuration of a projector device according to various embodiments.

Reference may be made to the accompanying drawings in the following description, and specific examples that may be practiced are shown as examples within the drawings. Other examples may be utilized and structural changes may be made without departing from the scope of the various examples.

DETAILED DESCRIPTION

Various example embodiments of the disclosure are now described in greater detail with reference to the accompanying drawings. However, the present disclosure may be implemented in other various forms and is not limited to the various example embodiments set forth herein. The same or similar reference denotations may be used to refer to the same or similar elements throughout the disclosure and the drawings. Further, for clarity and brevity, description of well-known functions and configurations in the drawings and relevant descriptions may not be made.

FIG. 1 is a block diagram illustrating an example configuration of a projector device according to various embodiments.

In an embodiment, an electronic device may be implemented in the form of a projector device (e.g., a master projector device MPJ or a slave projector device SPJ). In an embodiment, the master projector device MPJ and the slave projector device SPJ may implement a multi-projector system. The multi-projector system may adjust display performance, such as brightness, screen size, and screen magnification, by means of a plurality of projector devices.

In an embodiment, a display system includes a master projector device MPJ and a slave projector device SPJ. In an embodiment, the master projector device MPJ and the slave projector device SPJ may be electrically or communicatively connected. The master projector device MPJ may control the operation of the slave projector device SPJ through an electrical connection or a communication connection. In an embodiment, the master projector device MPJ and the slave projector device SPJ may have the same or different configurations. Each device is described below.

Referring back to FIG. 1, in an embodiment, the master projector device MPJ includes one or more processors (e.g., including processing circuitry) 110, one or more memories 120, and one or more transceivers (e.g., including communication circuitry) 130. In an embodiment, the master projector device MPJ may include at least one of one or more projectors (e.g., included in a projector unit) 140, one or more emitters (e.g., included in an emitter unit) 150, one or more visible light sensors (e.g., included in a visible light sensor unit) 160, and one or more invisible light sensors (e.g., included in an invisible light sensor unit) 170, as additional components.

In an embodiment, the master projector device MPJ may include a projector 140. In an embodiment, the projector 140 may include one or more projectors. In an embodiment, the projector 140 may include a projector and a projector circuitry for driving the projector. In an embodiment, the projector circuitry may be electrically connected with a processing circuitry. In an embodiment, the projector 140 may be configured to project an image in a visible light wavelength band.

In an embodiment, the emitter 150 may include one or more emitters. In an embodiment, the emitter 150 may include the emitter and an emitter circuitry for driving the emitter. In an embodiment, the emitter circuitry may be electrically connected to the processing circuitry. In an embodiment, the emitter 250 may be configured to project an image of an invisible light wavelength band. The invisible light wavelength band may include, but is not limited to, e.g., ultraviolet, near-ultraviolet, infrared, or near-infrared wavelength bands.

In an embodiment, the wavelength bands projected by the projector 140 and the emitter 150 may be configured not to overlap each other.

In an embodiment, the projector 140 and the emitter 150 may simultaneously or sequentially project light. For example, during a first frame, the projector 140 may project visible light and, during a second frame at least partially not temporally overlapping the first frame, the emitter 150 may project invisible light. For example, during the same frame, the projector 140 and the emitter 150, respectively, may project visible light and invisible light. The first frame and the second frame may be temporally divided.

In an embodiment, the visible light sensor 160 may include an image sensor. The visible light sensor 160 may detect light in a visible light wavelength band. In an embodiment, the field of view (FOV) of the visible light sensor 160 may be set to be larger than the field of view of the projector.

In an embodiment, one or more invisible light sensors 170 may include, but are not limited to, an infrared sensor, an IR sensor, and/or an ultraviolet sensor. The invisible light sensor 170 may detect light in an invisible light wavelength band other than the visible light wavelength band. In an embodiment, the field of view of the invisible light sensor may be set to be larger than the field of view of the projector. In an embodiment, the field of view of the invisible light sensor may be set to be the same as or similar to the field of view of the visible light sensor, but is not limited thereto. In the following disclosure, a case in which the fields of view of the visible light sensor 160 and the invisible light sensor 170 are identical is illustrated by way of non-limiting example and described, but various embodiments of the disclosure are not limited thereto.

In an embodiment, the slave projector device SPJ includes one or more processors 110, one or more memories 120, and one or more transceivers 130. In an embodiment, the master projector device MPJ may include at least one of one or more projectors 140, one or more visible light sensors 160, and one or more invisible light sensors 170, as additional components.

In an embodiment, the slave projector device SPJ may be electrically connected with the master projector device MPJ. In an embodiment, the slave projector device SPJ may be communicatively connected to the master projector device MPJ through a wireless interface. In an embodiment, the slave projector device SPJ may receive a control signal from the master projector device MPJ and may perform one or more operations based on the received control signal. In an embodiment, the slave projector device SPJ may be controlled by the master projector device MPJ. Without limitations thereto, for example, the master projector device MPJ may generate one or more commands for controlling a control method according to various example embodiments of the disclosure, which are described in greater detail below with reference to FIGS. 5 to 21, or transmit the commands to the slave projector device SPJ. For example, the slave projector device SPJ may perform a passive operation, such as outputting an image or performing synchronization based on commands received from the master projector device MPJ.

In an embodiment, the slave projector device SPJ may perform one or more operations based on a control signal or control command received from the master projector device MPJ and may transmit feedback in response to completing one or more operations. In an embodiment, the feedback may be transmitted to the master projector device MPJ for all or some of the control commands.

In an embodiment, the slave projector device SPJ may receive information, data or signals from the master projector device MPJ. In an embodiment, the slave projector device SPJ may operate based on the information, data or signals received from the master projector device MPJ. The information, data, or signals transmitted/received between the slave projector device SPJ and the master projector device MPJ according to an embodiment of the disclosure are described in greater detail below with reference to FIG. 3.

Referring back to FIG. 1, in an embodiment, the slave projector device SPJ may include the same or different components as/from the master projector device (MPJ).

In an embodiment, the slave projector device SPJ may have the same or similar configuration as the master projector device MPJ. In this case, any one of the plurality of projector devices may be set as the master projector device MPJ, and the rest may be set as slave projector devices SPJ. In an embodiment, the master projector device MPJ may be set based on user settings, but is not limited thereto. The user settings may be made based on, e.g., the user input received through an input module (e.g., mouse, keyboard, touchscreen, etc.), but is not limited thereto.

In an embodiment, the slave projector device SPJ may have a different configuration from the master projector device MPJ. In this case, the slave projector device SPJ may not include at least some of the component(s) of the master projector device MPJ. In an embodiment, the slave projector device SPJ may not include at least one of the visible light sensor 160 and the invisible light sensor 170. As such, the manufacturing cost of the slave projector device SPJ may be reduced by excluding some components.

Figure 2:
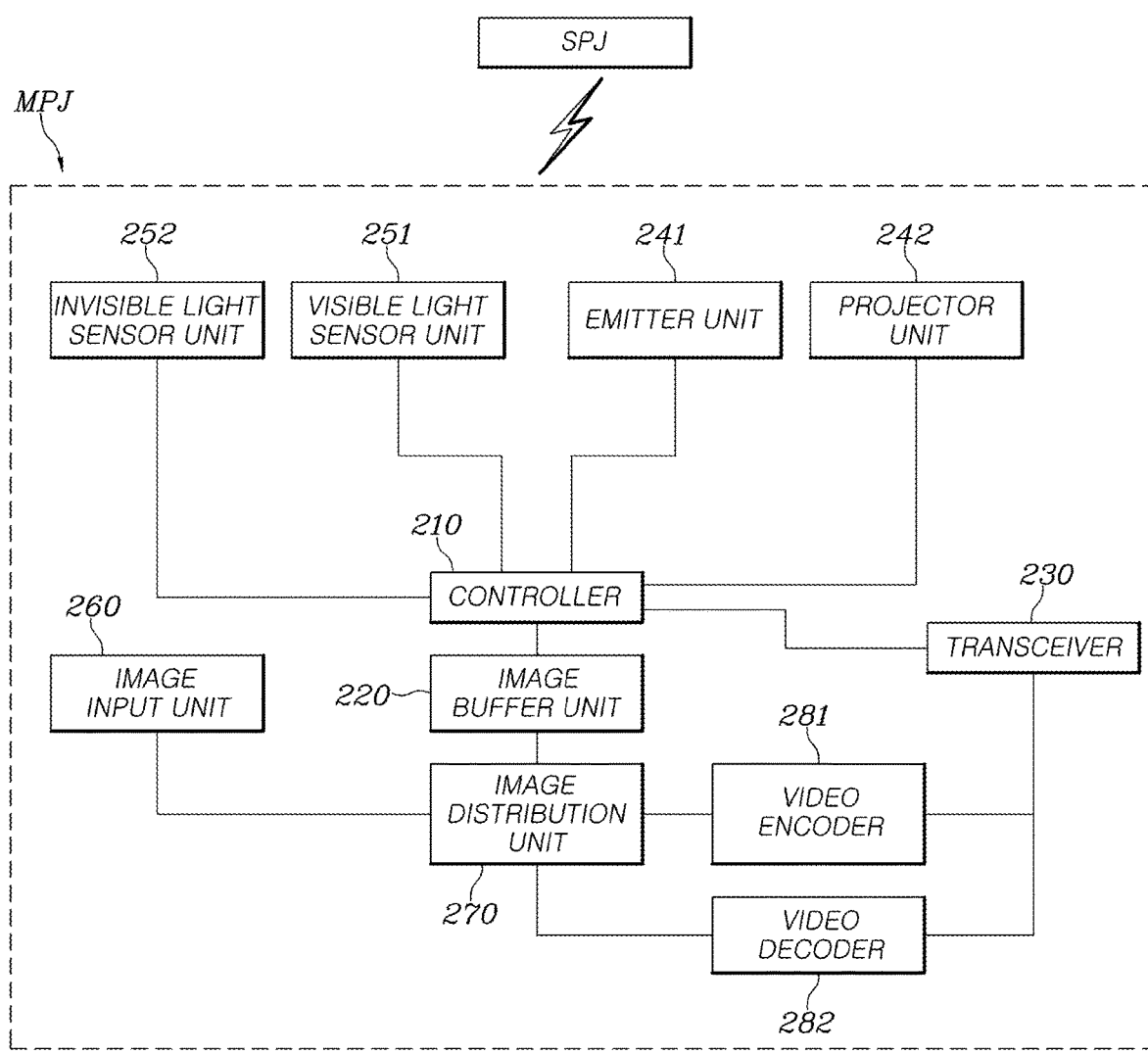
FIG. 2 is a block diagram illustrating an example configuration of a projector device according to various embodiments.

FIG. 2 is a block diagram illustrating an example configuration of a projector system according to various embodiments.

Referring to FIG. 2, according to an embodiment, a projector system includes a master projector device MPJ and a slave projector device SPJ coupled with the master projector device MPJ. The master projector device MPJ and the slave projector device SPJ may transmit and receive electrical signals through a wired or wireless interface.

In an embodiment, the master projector device MPJ may include a controller (e.g., including processing and/or control circuitry) 210. In an embodiment, controller 210 may be understood as including the processor 110 of FIG. 1. In an embodiment, the controller 210 may include a first processor and a second processor functionally distinct from the first processor. The first processor and the second processor may be electrically connected or implemented as an integrated processor. In an embodiment, the first processor may identify a pattern or analyze an image based on a visible indicator or an invisible indicator. Further, the first processor may electrically control electrically connected system components. In an embodiment, the second processor may perform warping, keystone, and edge blending. Further, the second processor may electrically control electrically connected system components.

In an embodiment, the controller 210 may be electrically connected with at least one of an invisible light sensor unit (e.g., including at least one invisible light sensor) 252, a visible light sensor unit (e.g., including at least one visible light sensor) 251, an emitter unit (e.g., including an emitter) 241, a projector unit (e.g., including a projector) 242, a transceiver (e.g., including communication circuitry) 230, an image buffer unit (e.g., including an image buffer) 220, an image distribution unit (e.g., including image distribution circuitry) 270, an image input unit (e.g., including image input circuitry) 260, a video encoder 281, and a video decoder 282.

In an embodiment, system components electrically connected to the controller 210 (e.g., the invisible light sensor unit 252, the visible light sensor unit 251, the emitter unit 241, the projector unit 242, the transceiver 230, the video buffer unit 220, the video distribution unit 270, the video input device 260, the video encoder 281, and the video decoder 282) may be operated according to control commands of the controller 210. In an embodiment, the operation of the individual system components may be understood as performed by the controller 210 or by the processing circuitries of the individual system components.

In an embodiment, the master projector device MPJ may include an image buffer unit 220. In an embodiment, the image buffer unit 220 may store synchronization timing information. In an embodiment, the image buffer unit 220 may store image data provided from the image distribution unit 270. In an embodiment, the image data stored in the image buffer unit 220 may be synchronized based on synchronization timing information. In an embodiment, the synchronized image data may be provided to the controller 210.

In an embodiment, the master projector device MPJ may include a transceiver 230. In an embodiment, the transceiver 230 may include various communication circuitry and transmit image data to the slave projector device SPJ. In an embodiment, the transceiver 230 may receive video data encoded by the video encoder 281 before transmitting the video data and transmit the encoded video data to the slave projector device SPJ.

In an embodiment, the transceiver 230 may transmit correction information for location correction. In an embodiment, the correction information may include at least one of synchronization timing information for image synchronization between projectors, image location information indicating the location where the image is to be projected, warping information for determining a projection range, or edge blending information for adjusting the brightness of the overlapping projection areas. In an embodiment, the correction information may be generated by the controller 210.

In an embodiment, the transceiver 230 may receive image data for projection. In an embodiment, the transceiver 230 may receive encoded video data. The encoded video data is provided to video decoder 282. The image data decoded by the video decoder 282 is provided to the image distribution unit 270.

In an embodiment, the master projector device MPJ may include an emitter unit 241 and/or a projector unit 242. In an embodiment, the master projector device MPJ may include an invisible light sensor unit 252 and/or a visible light sensor unit 251. In an embodiment, the description of the emitter unit 241, the projector unit 242, the emitter unit 241 and the projector unit 242 is the same as that of the emitter unit 150 and the projector unit 140 of FIG. 1, and no duplicate description is given below.

In an embodiment, the master projector device MPJ may include an image input device 260. The image input device 260 may be configured to receive image data according to, e.g., a high definition multimedia interface (HDMI) standard or a digital video interface (DVI) standard, but is not limited thereto.

In an embodiment, the master projector device MPJ may include an image distribution unit 270. In an embodiment, the image distribution unit 270 may provide the image data obtained through the video decoder 282 or the image input unit 260 to the video encoder 281 or the image buffer unit 220. In an embodiment, the image distribution unit 270 may provide at least part of the obtained entire image data to the image buffer unit 220 and provide the remaining part to the video encoder 281.

In an embodiment, the master projector device MPJ may include a video encoder 281 and a video decoder 282. The video encoder 281 may be configured to encode the video data before transmitting the video data to the slave projector device SPJ. The video decoder 282 may be configured to decode the encoded video data received from other electronic devices (e.g., server devices, STBs, user equipment (UE), or other projector devices).

Figure 3A:
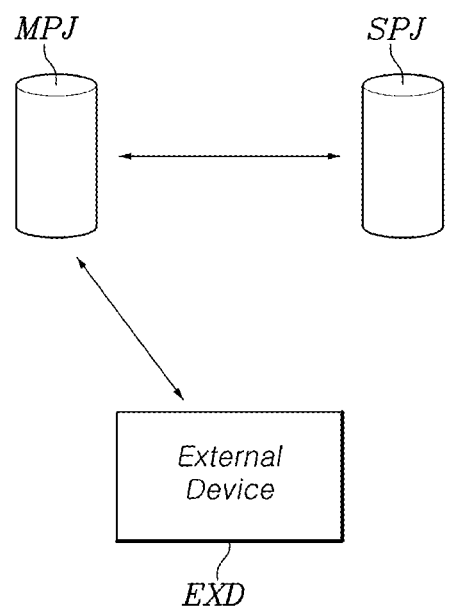
FIGS. 3A and 3B are diagrams illustrating an example configuration of a projector system according to various embodiments.
Figure 3B:
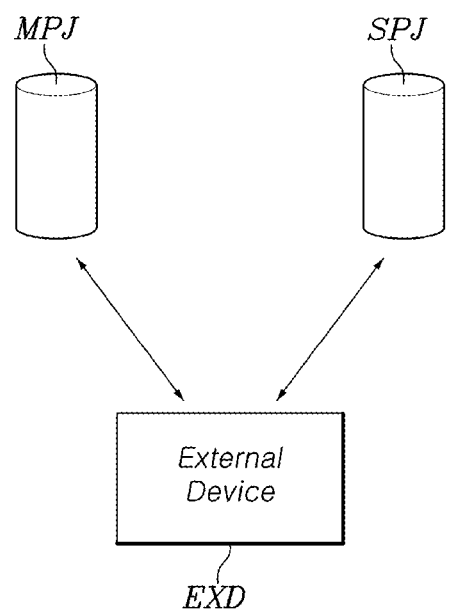

FIGS. 3A and 3B are diagrams illustrating an example projector system including an external device according to various embodiments.

Referring to FIGS. 3A and 3B, in an embodiment, the projector system may include a master projector device MPJ, a slave projector device SPJ, and an external device EXD.

In the case of the projector system shown in FIG. 3A, the slave projector device SPJ may be controlled by the master projector device MPJ. The external device EXD (e.g., a UE or a computing device) may be wiredly or wirelessly coupled to the master projector device MPJ.

In the case of the projector system shown in FIG. 3B, the master projector device MPJ and the slave projector device SPJ may be wiredly or wirelessly coupled with the external device EXD (e.g., a UE or a computing device).

In an embodiment, at least one of the master projector device MPJ and/or the slave projector device SPJ may be controlled based on a control command received from the external device EXD. For example, the master projector device MPJ may operate or control the slave projector device SPJ based on a control command received from the external device EXD. For example, the master projector device MPJ and the slave projector device SPJ may operate based on a control command received from the external device EXD. In other words, all or at least some of the control operations performed by the master projector device MPJ may be controlled by the external device EXD.

Figure 4:
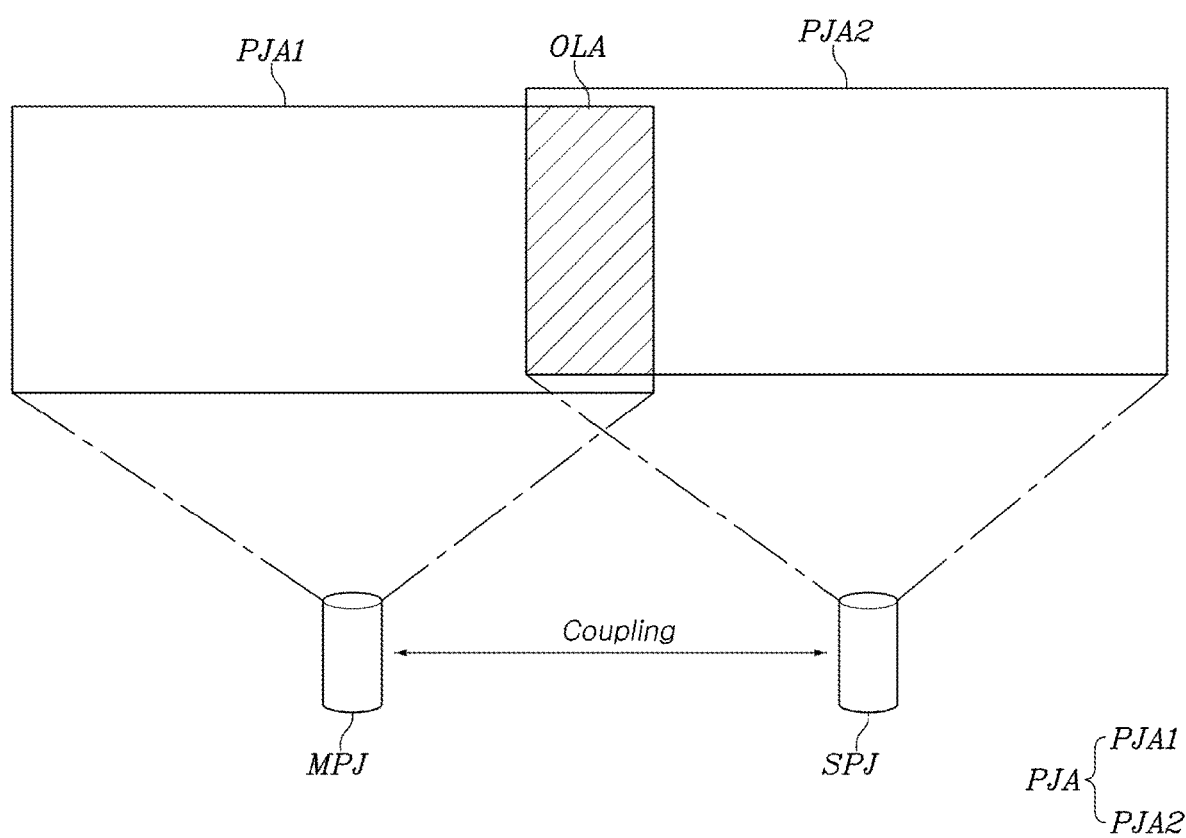
FIG. 4 is a diagram illustrating a projection area and an overlap area according to various embodiments.

FIG. 4 is a diagram illustrating an example projection area and an overlap area according to various embodiments.

Referring to FIG. 4, in an embodiment, the master projector device MPJ and the slave projector device SPJ may project an image toward the projection surface. When the image output by the projector device is reflected by the projection surface, an image may be represented in a predetermined projection area on the projection surface.

In an embodiment, the master projector device MPJ may project an image to the first projection area PJA1 on the projection surface, and the slave projector device SPJ may project an image to the second projection area PJA2 on the projection surface. In an embodiment, the first projection area PJA1 and the second projection area PJA2 may at least partially overlap. As the first projection area PJA1 and the second projection area PJA2 overlap, the first projection area PJA1 and the second projection area PJA2 may form an overlapping area OLA, as at least a portion.

Figure 5:
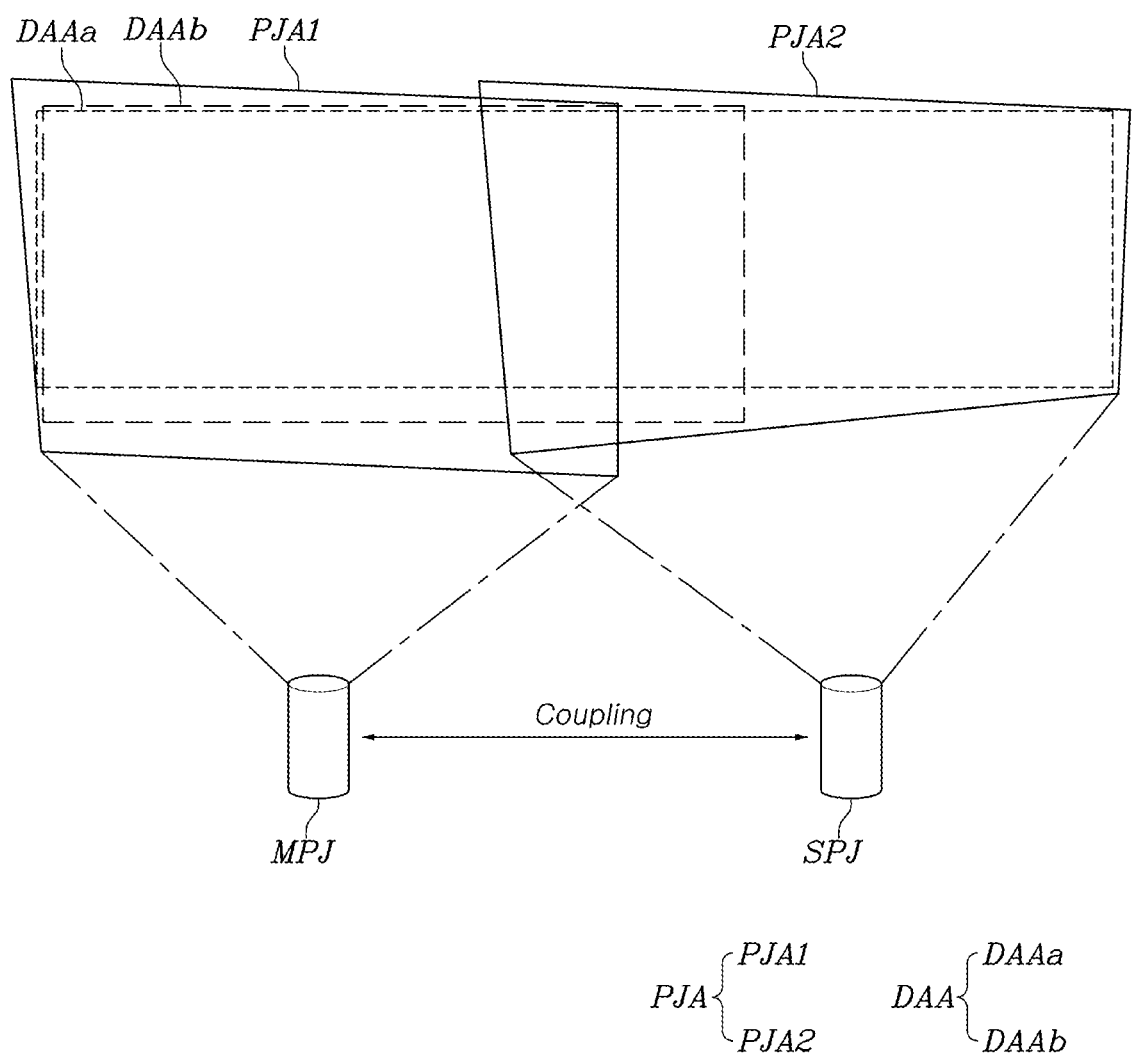
FIG. 5 is a diagram illustrating a displayable area according to various embodiments.

FIG. 5 is a diagram illustrating a displayable area according to various embodiments.

Referring to FIG. 5, in an embodiment, the projection areas PJA1 and PJA2 formed on the projection surface may be formed as distorted polygons rather than rectangles. When the projector device projects an image in a direction perfectly perpendicular to the projection surface, the projection areas may be formed in rectangular shapes. However, when the direction in which an image is projected by the projector device is not perpendicular to the projection surface, the projection area may be formed in various polygonal shapes other than a perfect rectangle.

In an embodiment, the projector device MPJ may identify an area where content may be displayed within the projection area. In an embodiment, one or more processors of the master projector device MPJ may identify "displayable areas DAAa and DAAb" having a predetermined (e.g., specified) size in the entire projection area PJA including the first projection area PJA1 and the second projection area PJA2. In an embodiment, the displayable areas DAAa and DAAb may be set to have a rectangular shape, but are not limited thereto. In an embodiment, the displayable areas DAAa and DAAb may be set to have a preset shape and a preset ratio. The displayable areas DAAa and DAAb may be identified or formed inside the entire projection area PJA based on at least one of a preset (e.g., specified) shape and a preset ratio. For example, as shown in FIG. 5, the displayable areas DAAa and DAAb may be identified to have a maximum size based on two ratios. The first displayable area DAAa having the first ratio and the second displayable area DAAb having the second ratio may be formed within the entire projection area PJA to form a rectangle having a maximum size in each ratio.

In an embodiment, when two or more ratio setting values are set, a plurality of displayable areas DAAa and DAAb may be identified. When there are two or more ratio setting values, the projector device MPJ may compare the areas of the rectangles based on the respective ratio setting values. The projector device MPJ may select any one (e.g., DAAa) of a plurality of displayable areas to form a larger area.

In an embodiment, the displayable area DAA may be changed based on a user input UIN. In an embodiment, when there are a plurality of displayable areas DAA, the projector device MPJ may switch from the first displayable area DAAa to the second displayable area DAAb based on the user input UIN.

FIGS. 6, 7, 8, 9, and 10 are diagrams illustrating examples of a content display area according to various embodiments.

Figure 6:
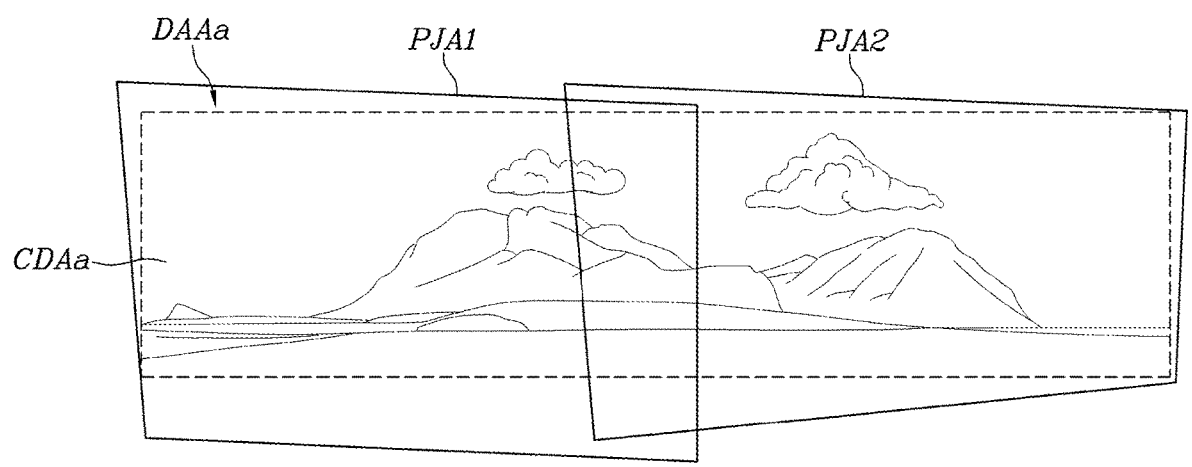
FIGS. 6, 7, 8, 9, and 10 are diagram illustrating a content display area according to various embodiments.
Figure 7:
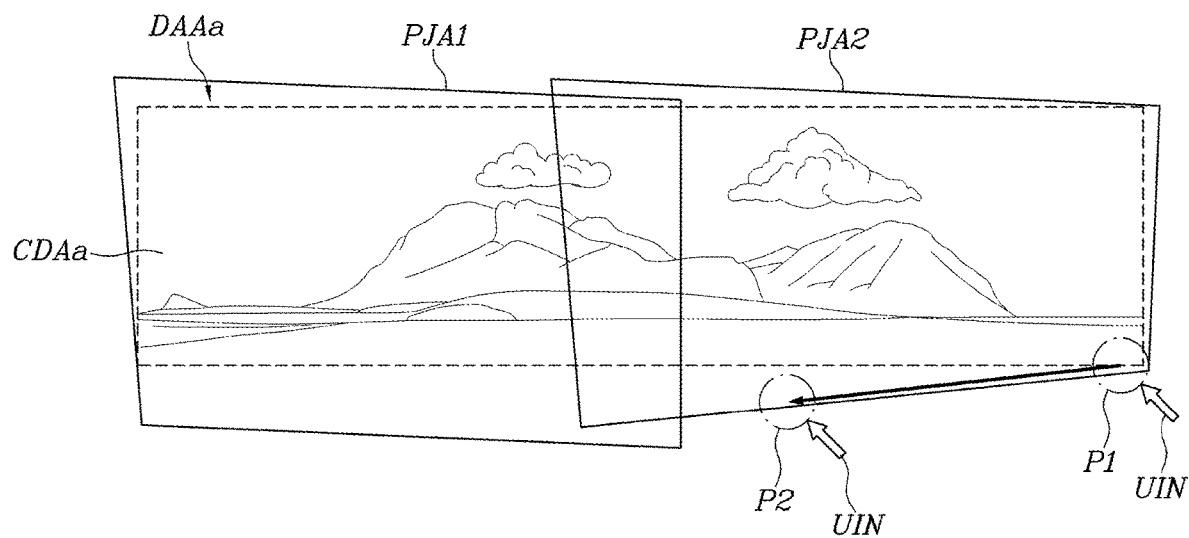

Referring to FIG. 6, in an embodiment, at least a portion of the displayable area DAAa may include a content display area CDAa. The content display area CDAa refers to an area that actually displays media, such as images, on the projection area. In an embodiment, the content display area CDAa may be provided as at least a portion or at least the entirety of the displayable area DAAa. FIG. 7 illustrates an example in which the content display area CDAa is set as the entire displayable area DAAa, but is not limited thereto. For example, as shown in FIG. 9, the content display area CDAa may be set as at least a portion of the displayable area DAAa.

Referring to FIG. 7, in an embodiment, the displayable area DAAa may be adjusted based on the user input UIN. For example, when the user input UIN dragging from a first point P1 to a second point P2 is received, the displayable area DAAa may be adjusted to have a corner at the second point where the user input UIN ends. In an embodiment, the displayable area DAAa which is adjusted based on the user input UIN may be reset and represented based on a preset ratio or be represented to correspond to the second point P2 of the user input UIN regardless of the preset ratio. In an embodiment, the user input UIN may be input along the boundary of the first projection area PJA1 or the second projection area PJA2, but is not limited thereto.

Figure 8:
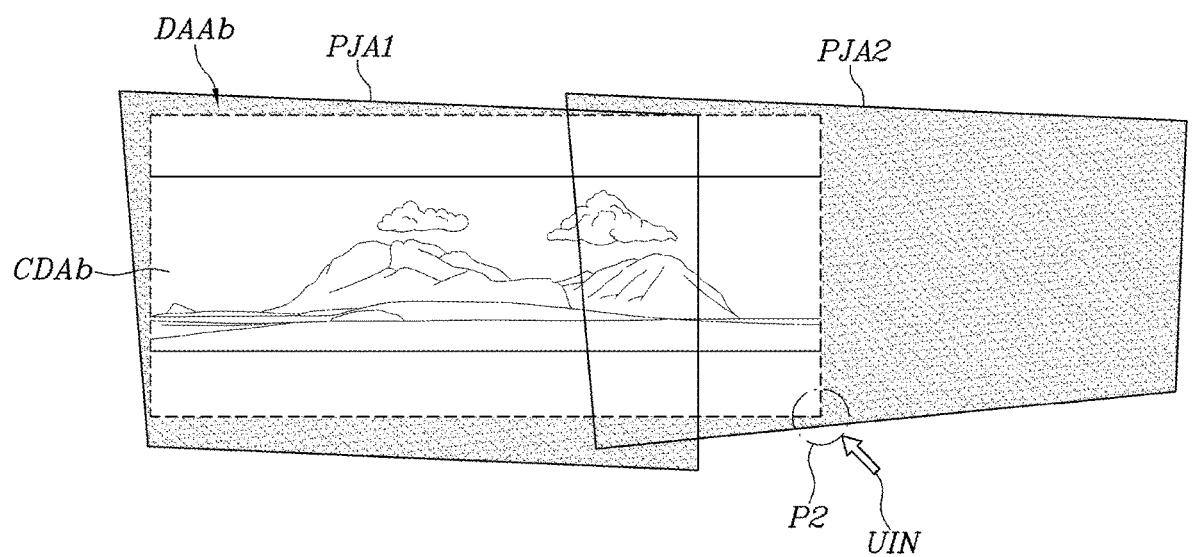

Referring to FIG. 8, the reset displayable area DAAb (second displayable area DAAb) may be set to have a different ratio and/or size from the first displayable area DAAa. In an embodiment, the projector device may project an image such that the content display area CDAb is included as at least a portion of the reset displayable area DAAb. In an embodiment, the content display area CDAb may maintain the ratio before the displayable area DAAb is reset, or may be represented with a ratio reset to correspond to the current displayable area DAAb.

Figure 9:
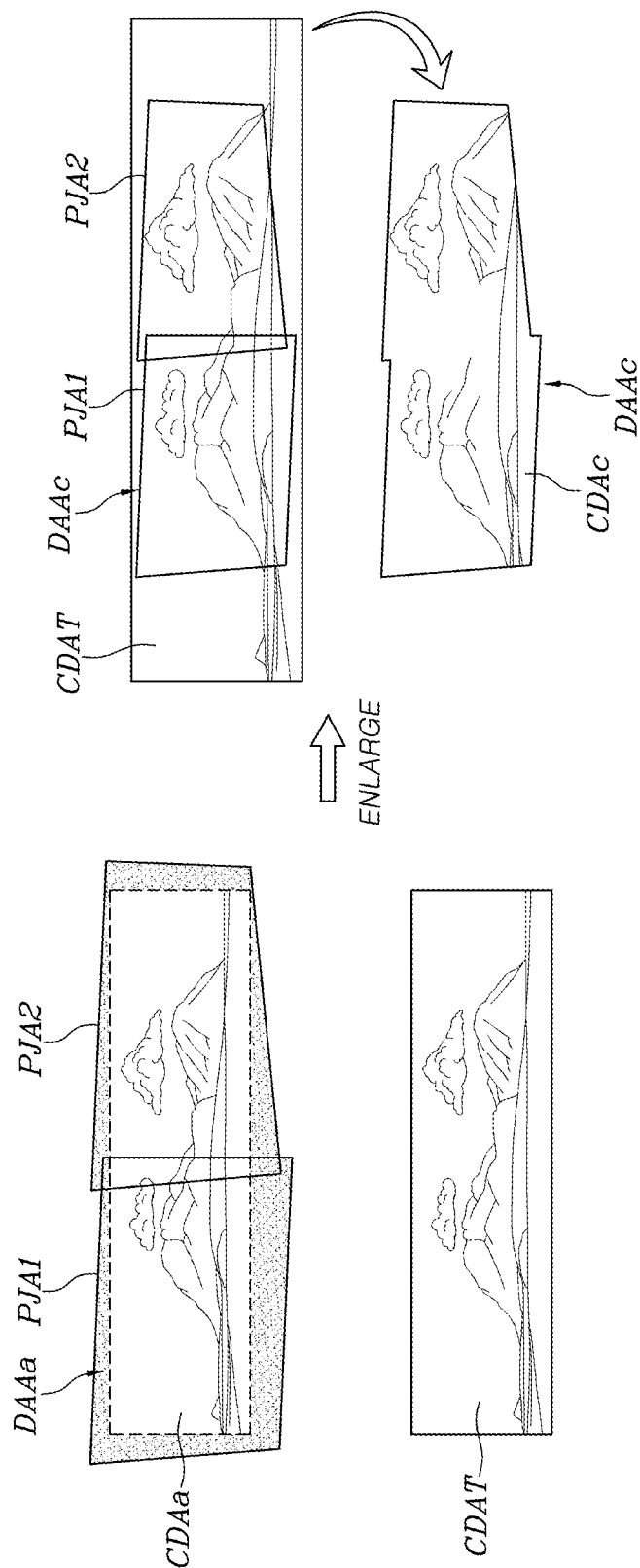
Figure 10:
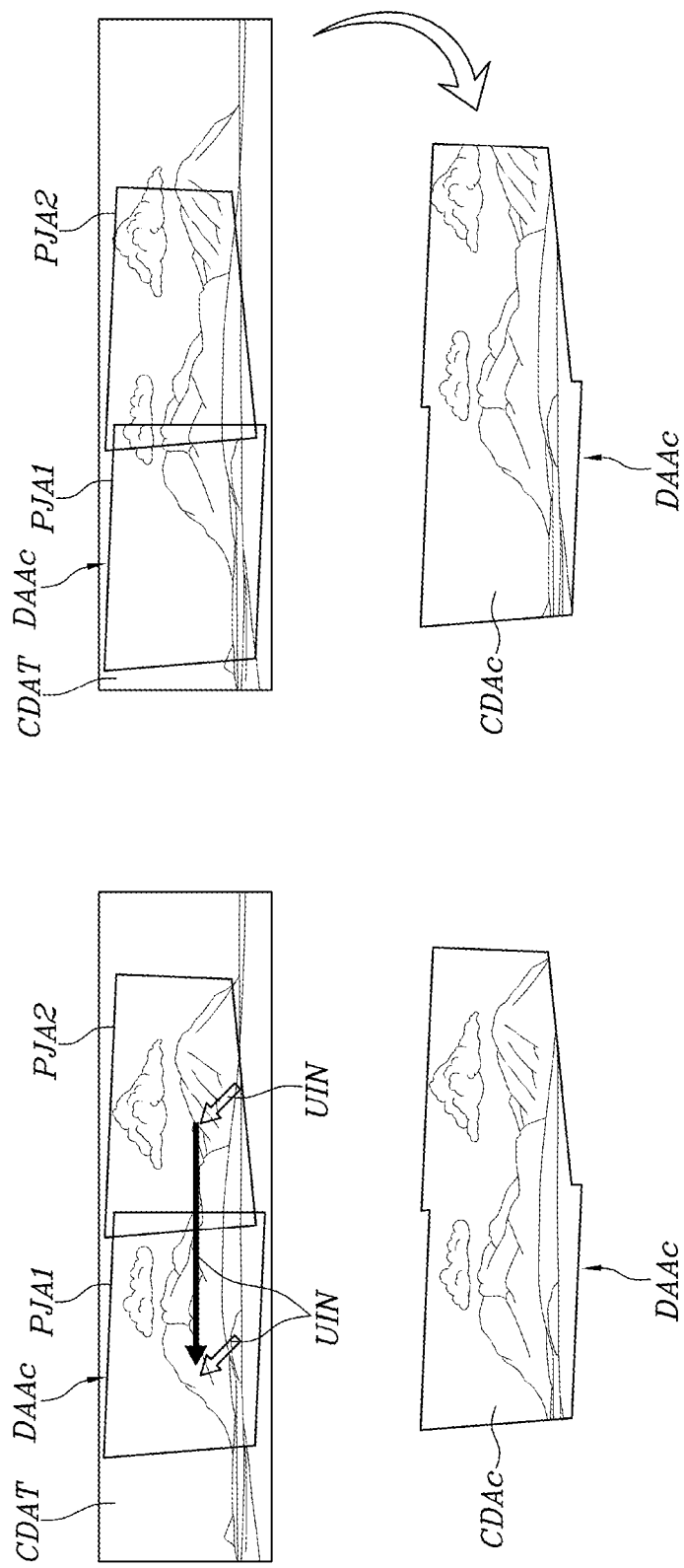

Referring to FIGS. 9 and 10, the displayable area DAA and/or content display area CDA is not limited to a rectangular shape, and in an embodiment, the displayable area DAA may be set to correspond to the entire projection area PJA. In an embodiment, the projector device MPJ may increase the dimensions of the image CDAT to be output to be larger than the entire projection area PJA or reduce the dimensions of the entire projection area PJA to be smaller than the image CDAT to be output. In this case, in an embodiment, the content display area CDAc may be formed over the entire projection area PJA. In other words, the displayable area DAAc and/or the content display area CDAc may have a shape corresponding to the entire projection area PJA (See FIG. 9).

In an embodiment, when the shapes of the content display area CDAc and the entire projection area PJA match, the image displayed on the content display area CDAc may be limited to at least a portion of the image CDAT to be output. In an embodiment, the image represented on the content display area CDAc may be represented with the first area switched to the second area of the entire image CDAT to be output, based on the user input UIN.

FIGS. 11, 12, 13, 14, 15 and 16 are diagrams illustrating example edge blending in an overlap area according to various embodiments.

Figure 11:
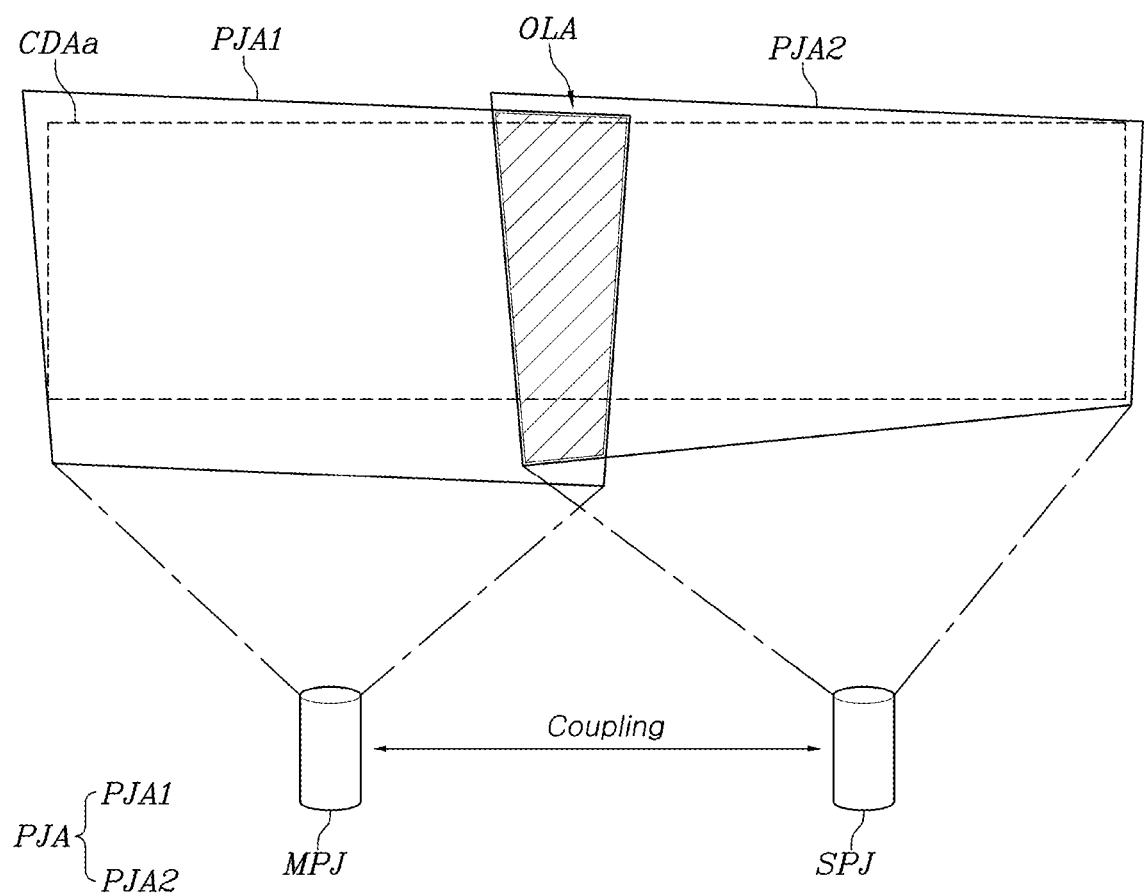
FIGS. 11, 12, 13, 14, 15 and 16 are diagrams illustrating edge blending in an overlap area according to various embodiments.

Referring to FIG. 11, in an embodiment, the projector device(s) MPJ and SPJ may represent an image in a predetermined projection area by radiating light to the projection surface. The first projector device MPJ (e.g., the master projector device MPJ) may display an image on the first projection area PJA1. The second projector device SPJ (e.g., the slave projector device SPJ) may display an image on the second projection area PJA2. In an embodiment, an overlap area OLA may be formed in a partial area where the first projection area PJA1 and the second projection area PJA2 overlap.

Since the projector device represents an image on the projection surface in a manner of radiating light to the projection surface, it is impossible to represent perfect black. Accordingly, in the overlap area OLA, the projection areas PJA1 and PJA2 of two or more projector devices overlap, and brightness may be higher than in other areas. In an embodiment, the projector device(s) MPJ and SPJ may execute a predetermined algorithm so that a brightness difference between the overlap area OLA and other areas is not viewed. The predetermined algorithm is described below with reference to FIGS. 12 to 16.

Figure 12:
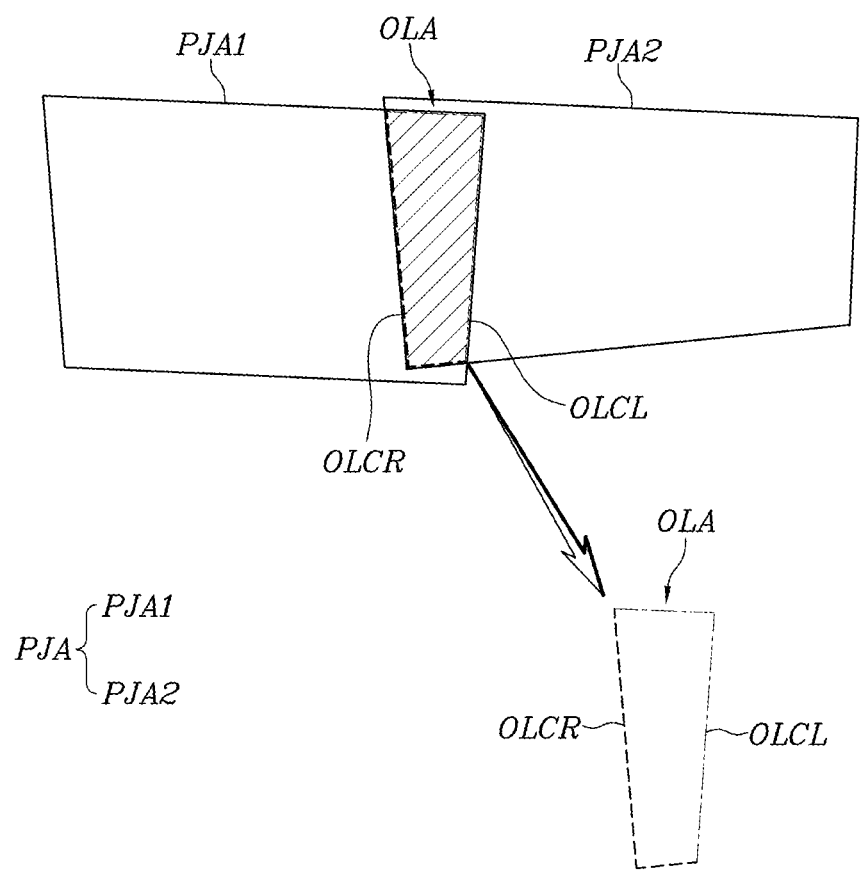

Referring to FIG. 12, in an embodiment, an overlap area OLA may be specified as an area where the first and second projection areas PJA1 and PJA2 overlap.

In an embodiment, the overlap area OLA may be identified by the visible light sensor unit of the master projector device MPJ. For example, the master projector device MPJ may identify the overlap area OLA based on the difference in brightness in the overlap area OLA.

In an embodiment, the overlap area OLA may be identified based on configuration information about the projection direction and projection range of the master projector device MPJ and configuration information about the projection direction and projection range of the slave projector device SPJ.

In an embodiment, the overlap area OLA may be formed to have at least three or at least four sides. In an embodiment, the plurality of surfaces of the overlap area OLA may be identified based on the type of projection area corresponding to each surface.

Referring to the overlap area OLA shown in FIG. 12, two surfaces of the overlap area OLA may overlap at least some of the boundary surfaces of the first projection area PJA1, and the other two surfaces of the overlap area OLA may overlap at least some of the boundary surfaces of the second projection area PJA2. In an embodiment, the surface of the overlap area OLA may be identified as a portion overlapping at least some of the boundary surfaces of the first projection area PJA1 and the second projection area PJA2. In an embodiment, a portion overlapping the boundary surfaces of the first projection area PJA1 may be defined as a first overlap edge OLCL, and a portion overlapping the boundary surfaces of the second projection area PJA2 may be defined as a second overlap edge OLCR.

When two or more projector devices represents a bright grayscale, a brighter grayscale may be represented in an area where two or more projection areas overlap than other target areas. According to an embodiment, the projector device(s) MPJ and SPJ may mitigate the visibility of such a difference in grayscale by applying a grayscale change to the overlap area OLA corresponding to each projection area.

Figure 13:
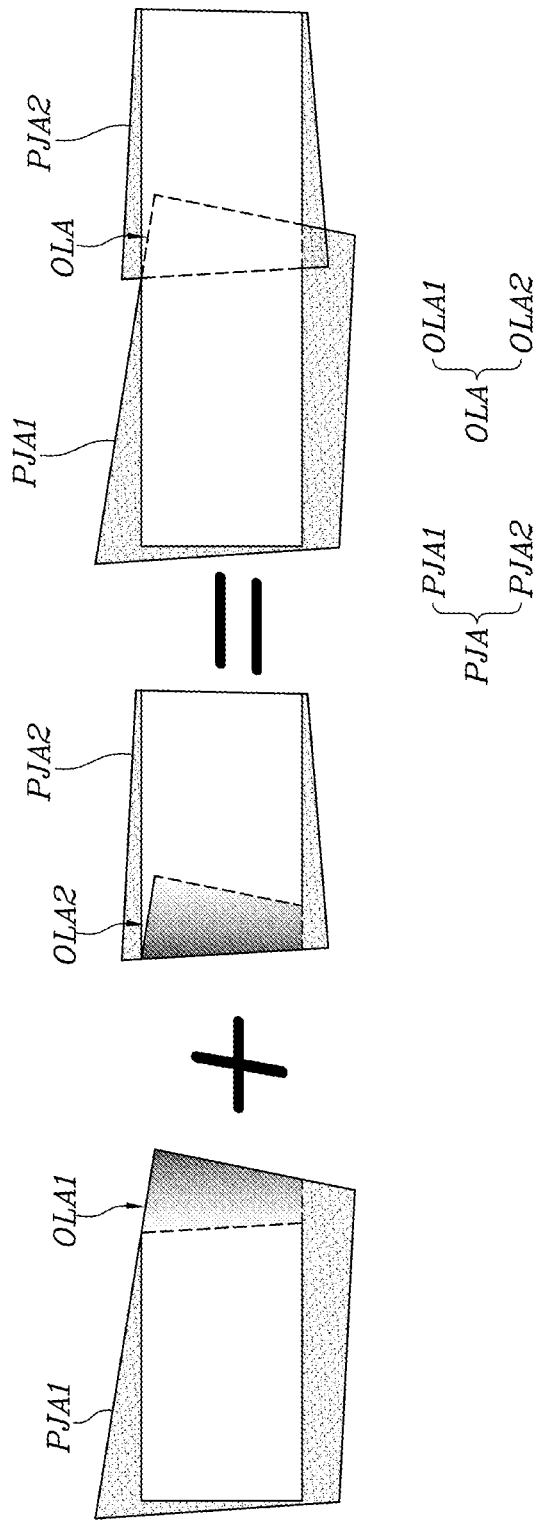

Referring to FIG. 13, the overlap area OLA may include a first overlap area OLA1 and a second overlap area OLA2. In an embodiment, the first overlap area OLA1 may be included in the first projection area PJA1 and may be identified as at least a portion of the area to overlap the second projection area PJA2. In an embodiment, the second overlap area OLA2 may be included in the second projection area PJA2 and may be identified as at least a portion of the area to overlap the first projection area PJA1. When the first projection area PJA1 and the second projection area PJA2 overlap, the first overlap area OLA1 and the second overlap area OLA2 may overlap each other, and comprise the overlap area OLA.

In an embodiment, the first overlap area OLA1 and the second overlap area OLA2 may be represented with different grayscale changes.

In the first overlap area OLA1, the brightness may be represented so that the grayscale becomes darker from left to right. In the second overlap area OLA2, the brightness may be represented so that the grayscale becomes darker from right to left. In an embodiment, the direction from left to right may be understood as a direction from the first projection area PJA1 to the second projection area PJA2. In an embodiment, a direction from right to left may be understood as a direction from the second projection area PJA2 to the first projection area PJA1. As such, as the first overlap area OLA1 and the second overlap area OLA2 are represented with grayscale changes complementary to each other, the overlap area OLA may be represented with overall a uniform grayscale.

When two or more projector devices represent a dark grayscale, a brighter grayscale may be represented in an area where two or more projection areas overlap than other target areas. According to an embodiment, the projector device(s) MPJ and SPJ may control the overlap area OLA or a predetermined area including the overlap area OLA to be represented in a predetermined grayscale. According to an embodiment, the projector device(s) MPJ and SPJ may apply a change in grayscale to be naturally harmonized with the grayscales of other projection areas in the area represented in a predetermined grayscale and an area(s) with a predetermined width, thereby mitigating the visibility of the grayscale difference.

Figure 14:
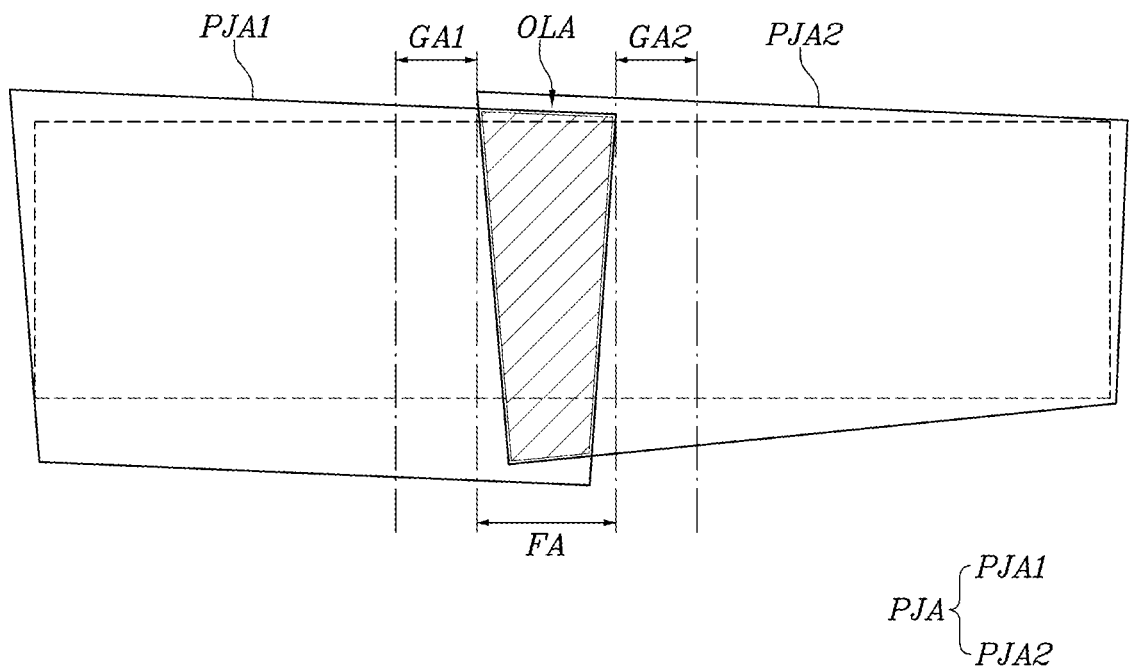
Figure 15:
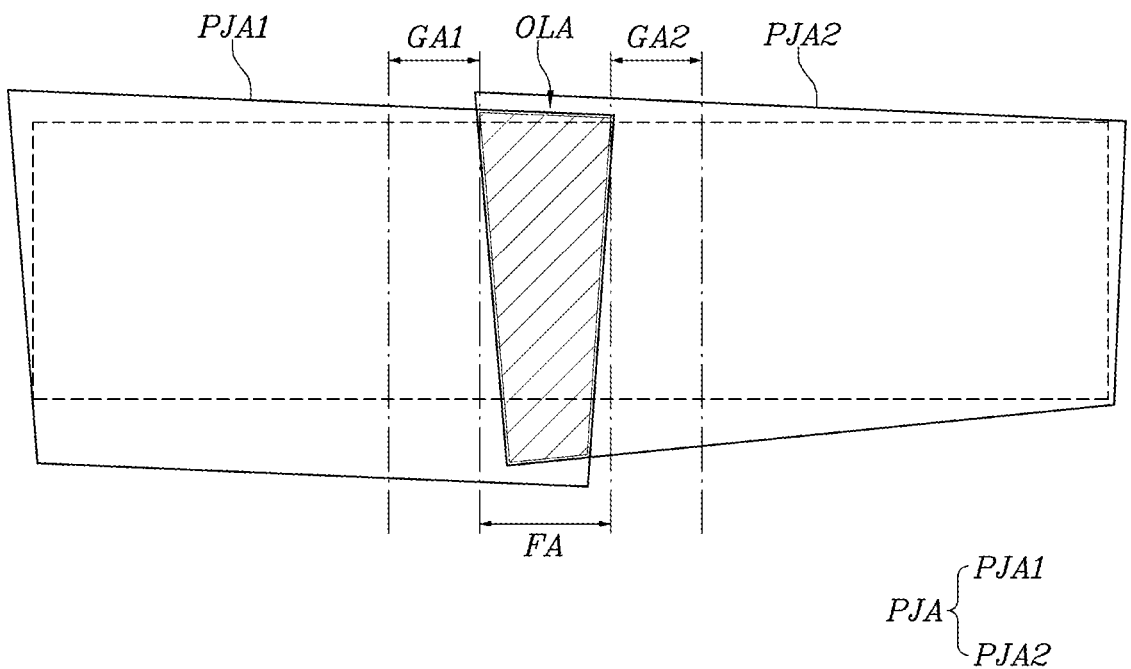

Referring to FIGS. 14 and 15, the overlap area OLA may be formed in a portion where the first projection area PJA1 and the second projection area PJA2 overlap. In an embodiment, at least a portion of the entire projection area PJA may be set as a filling area FA, and gradation areas GA1 and GA2 may be set on the left and right sides, respectively, of the filling area FA, each having a predetermined width.

As shown in FIG. 14, the filling area FA may be set with respect to a virtual line passing through the rightmost and leftmost reference points with respect to the projection areas PJA1 and PJA2. The virtual line may be set to pass through the reference points in the height direction of the displayable area DAA. In an embodiment, the gradation areas GA1 and GA2 may be formed outward of the projection area from the virtual line. In an embodiment, the gradation areas GA1 and GA2 may be identified with a preset predetermined width.

As shown in FIG. 15, the filling area FA may be set with respect to a virtual line passing through the rightmost and leftmost reference points with respect to the overlap area OLA. The virtual line may be set to pass through the reference points in the height direction of the displayable area DAA. In an embodiment, the gradation areas GA1 and GA2 may be formed outward of the projection area from the virtual line. In an embodiment, the gradation areas GA1 and GA2 may be identified with a preset predetermined width.

Figure 16:
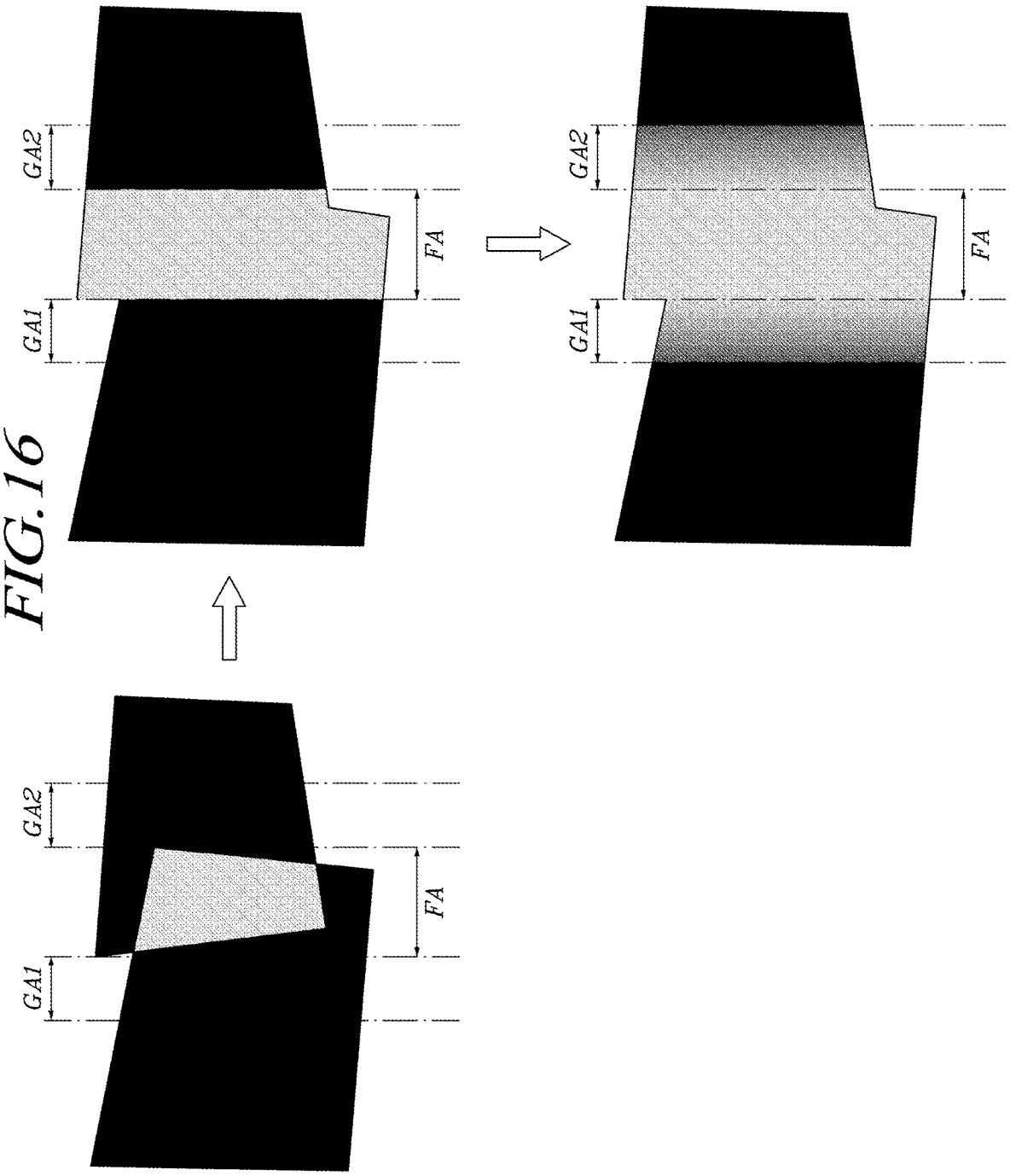

Referring to FIG. 16, in an embodiment, the filling area FA may be represented as a preset grayscale value. In an embodiment, the gradation areas GA1 and GA2 may be represented so that the grayscale value gradually changes from the grayscale value of the filling area FA to the grayscale value of the projection area adjacent to the gradation areas GA1 and GA2.

Figure 17:
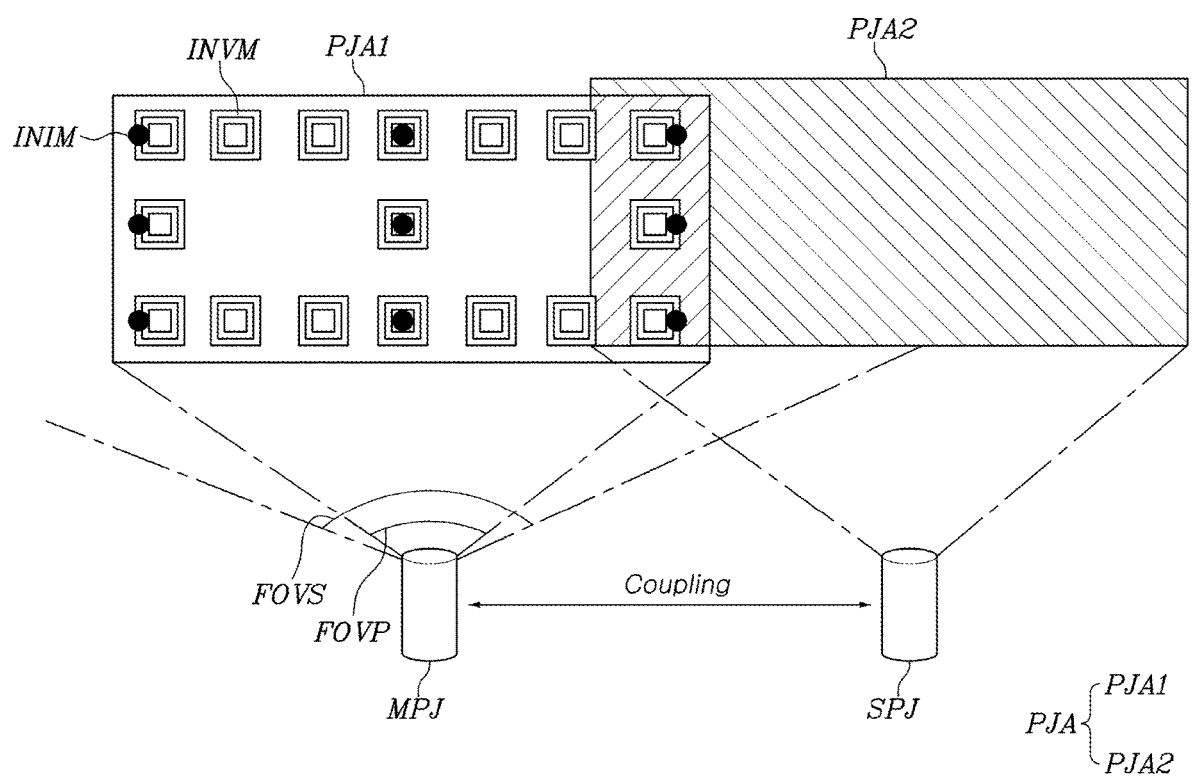
FIGS. 17, 18, 19, 20, and 21 are diagrams illustrating correction of a projection direction and a projection range using an invisible indicator according to various embodiments.
Figure 18:
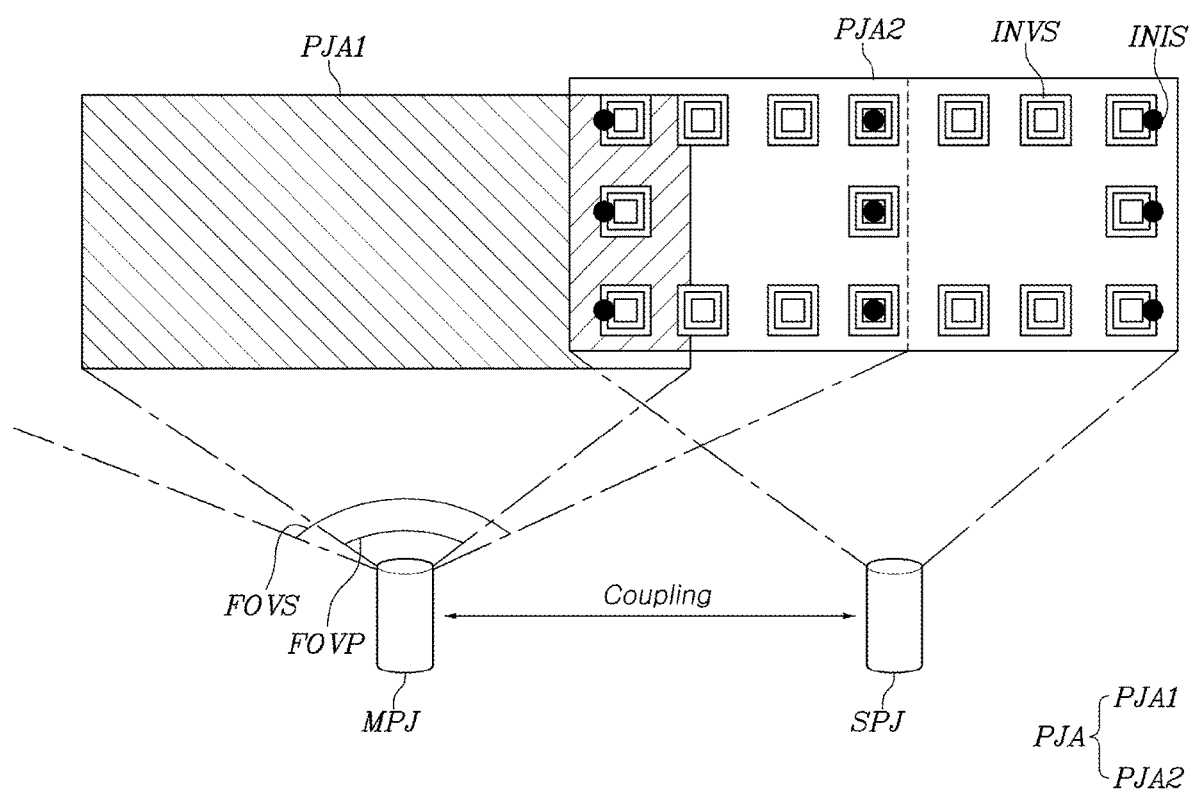

FIGS. 17 and 18 are diagrams illustrating an example process of setting a positional relationship between projector devices according to various embodiments.

Referring to FIGS. 17 and 18, in an embodiment, one or more processors may project one or more indicators toward the projection surface by means of the projectors MPJ and SPJ. In an embodiment, the indicator may include at least one of a plurality of visible indicators INVM and INVS and/or a plurality of invisible indicators INIM and INIS or may be divided into them.

In an embodiment, the visible indicators INVM and INVS may be displayed on the projection surface by the projector unit. In an embodiment, the invisible indicators INIM and INIS may be displayed on the projection surface by the emitter unit. In an embodiment, the visible indicators INVM and INVS and the invisible indicators INIM and INIS may be displayed to overlap in at least some areas, but are not limited thereto.

In an embodiment, at least some of the visible indicators INVM and INVS may be displayed adjacent to four corners of the projection area. In an embodiment, at least some of the invisible indicators INIM and INIS may be displayed adjacent to four corners of the projection area.

In an embodiment, at least some of the visible indicators INVM and INVS may be displayed vertically side by side in the center portion of the projection area. In an embodiment, the projection area may be divided into at least two zones by the visible indicators INVM and INVS, but is not limited thereto. In an embodiment, at least two zones divided by the visible indicators INVM and INVS may be specified as areas surrounded by the visible indicators INVM and INVS, respectively.

In an embodiment, the invisible indicators INIM and INIS may be displayed with a narrower vertical arrangement interval than a horizontal arrangement interval. In an embodiment, the invisible indicators INIM and INIS may be respectively displayed at corners of the projection area, center points of the corners, and center points of surfaces of the projection area, but are not limited thereto.

Figure 19:
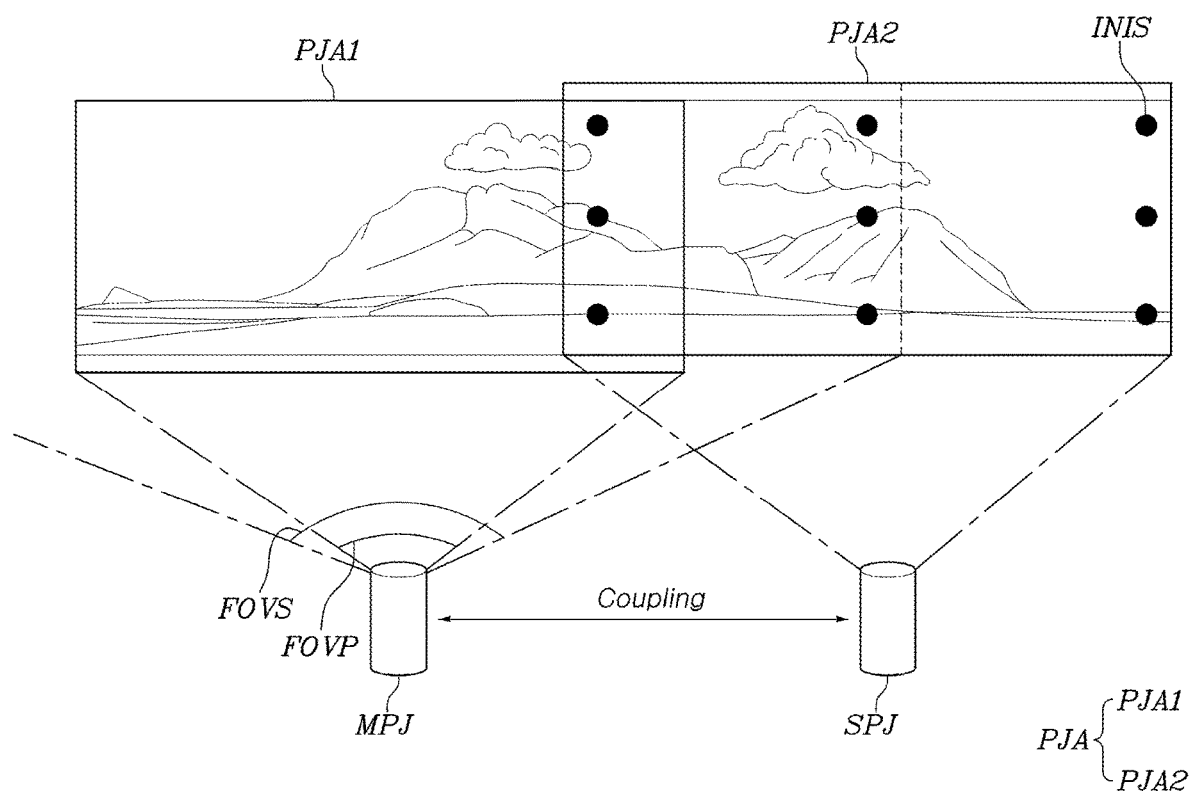

In an embodiment, the projector devices MPJ and SPJ may display invisible indicator(s) INIM and INIS and visible indicator(s) INVM and INVS. In an embodiment, the first projector device MPJ may project visible indicators INVM and INVS and invisible indicators INIM and INIS onto the projection surface at a different timing from that of the second projector device SPJ. In an embodiment, the first projector device MPJ may control the second projector device SPJ to project the visible indicator(s) INVM and INVS and the invisible indicator(s) INIM and INIS onto the projection surface. For example, FIG. 18 illustrates an example in which the first projector device MPJ displays the visible indicator(s) INVM and the invisible indicator(s) INIM on the projection surface. FIG. 19 illustrates an example in which the second projector device SPJ displays the visible indicator(s) INVS and the invisible indicator(s) INIS on the projection surface.

In an embodiment, sensors (e.g., the visible light sensor and the invisible light sensor) included in the projector device may have a larger field of view than the projector.

In an embodiment, the projector may project visible indicator(s) INVM and INVS in a first field of view FOVP, and the visible light sensor may identify the visible indicator(s) INVM and INVS in a second field of view (e.g., FOVS). In an embodiment, the second field of view (e.g., FOVS) may be set to be larger than the first field of view FOVP. In other words, the visible light sensor may have a larger field of view than the projector. In an embodiment, as the second field of view (e.g., FOVS) is set to be larger than the first field of view FOVP, the first projector device MPJ may identify at least some of the visible indicator(s) INVS displayed on the projection surface by the second projector device SPJ.

In the disclosure, the field of view of the invisible light sensor may be defined as a third field of view (e.g., FOVS).

In an embodiment, the invisible light sensor may have the same or different field of view as/from the visible light sensor. In an embodiment, the invisible light sensor may have a larger field of view than the projector. In an embodiment, as the third field of view (e.g., FOVS) is set to be larger than the first field of view FOVP, the first projector device MPJ may identify at least some of the invisible indicator(s) INIS displayed on the projection surface by the second projector device SPJ.

In an embodiment, the first projector device MPJ may not only identify the visible indicator(s) INVM and the invisible indicator(s) INIM on the first projection area PJA1, but also identify at least some of the visible indicator(s) INVS and invisible indicator(s) INIS on the second projection area PJA2.

In an embodiment, the first projector device MPJ may generate a first relationship matrix based on at least four visible indicators INVM. For example, the first projector device MPJ may compare the coordinate values (first coordinate value) of the visible indicators INVM stored in the memory with the coordinate values (second coordinate value) of the visible indicators INVM identified by the visible light sensor. In an embodiment, the first relationship matrix may be generated based on the first coordinate value and the second coordinate value. In an embodiment, the first relationship matrix may be stored in the memory of the first projector device MPJ. The first relationship matrix represents the positional relationship between the projection surface and the first projector device MPJ.

In an embodiment, the first projector device MPJ may generate a second relationship matrix based on the visible indicators INVS identified on the second projection area PJA2. The second relationship matrix may be stored in the memory of the first projector device MPJ. The second relationship matrix represents the positional relationship between the projection surface and the second projector device SPJ.

In an embodiment, the first and second relationship matrices may be formed of homography matrices.

In an embodiment, the first projector device MPJ may generate a third relationship matrix by associating the first relationship matrix with the second relationship matrix. In an embodiment, the third relationship matrix may indicate a display relationship between the first projection area PJA1 and the second projection area PJA2.

In an embodiment, the first projector device SPJ may associate coordinate values of the invisible indicators INIS identified through the invisible light sensor in the second projection area PJA2 with the third relationship matrix. In an embodiment, the first projector device MPJ may create a reference positional relationship by associating the coordinate values of the invisible indicators INIS identified in the second projection area PJA2 with the third relationship matrix. In an embodiment, the reference positional relationship may be defined as a homography matrix.

In the disclosure, "reference positional relationship" may be used interchangeably with "final homography matrix" or "reference homography matrix". In the disclosure, "homography matrix" may be expressed as "reference positional relationship" depending on the context, but is not limited thereto.

Since the emitter, projector, and sensor (e.g., visible light sensor or invisible light sensor) of each projector device MPJ and SPJ are installed in fixed positions, the reference positional relationship may always be determined to be valid.

Figure 20:
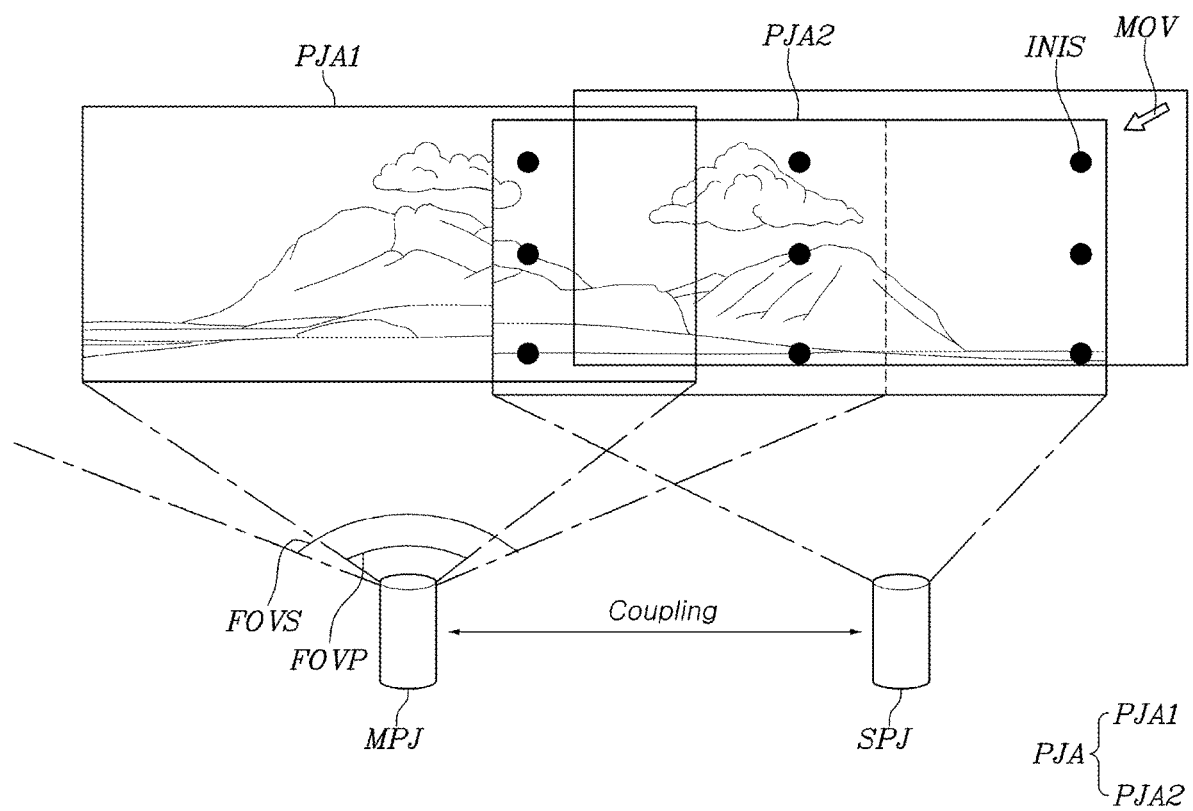
Figure 21:
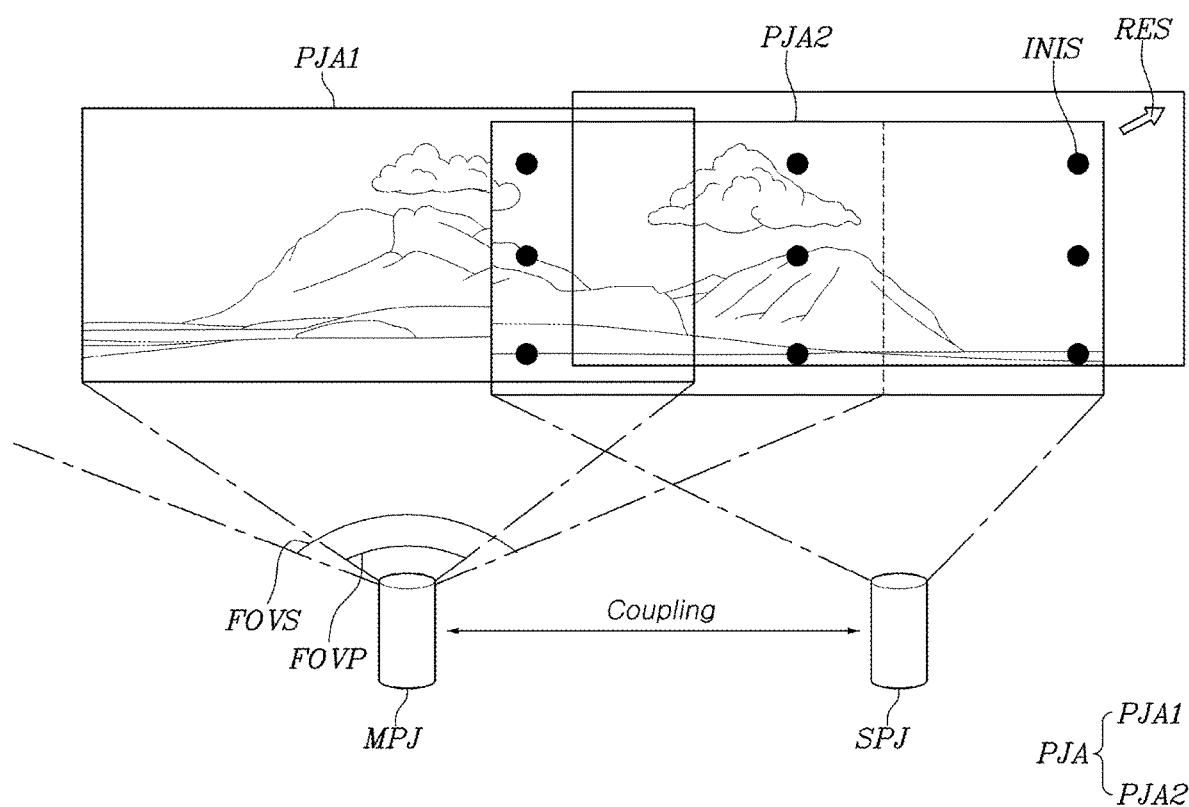

FIGS. 19, 20 and 21 are diagrams illustrating an example process for reidentifying the position of the second projector device using invisible indicators and correcting it according to various embodiments.

Referring to FIG. 19, the projector devices MPJ and SPJ may display an image on a projection surface through a plurality of projection areas. In an embodiment, the first projector device MPJ and the second projector device SPJ may project an image toward the projection surface in a first field of view FOVP. The fields of view of the first projector device MPJ and the second projector device SPJ are illustrated as the first field of view FOVP, but the fields of view of both the devices are not limited as being the same.

In an embodiment, while projecting an image onto the projection surface, the second projector device SPJ may display the invisible indicator INIS on the second projection area PJA2 by the emitter. Since the invisible indicator INIS is not visually recognized, it does not cause any inconvenience when the user views the image.

In an embodiment, the first projector device MPJ may identify the invisible indicator INIS displayed on the projection surface by the second projector device SPJ through the invisible light sensor. In an embodiment, the first projector device MPJ may identify at least some of the plurality of invisible indicators INIS displayed on the second projection area PJA2 through the invisible light sensor having the third field of view (e.g., FOVS). For reference, as described above, the third field of view (e.g., FOVS) may be set to be larger than the first field of view FOVP.

In an embodiment, the first projector device MPJ may compare the position of the second projection area PJA2 with the position when generating the homography matrix using the identified coordinate values of the invisible indicators INIS identified through the invisible light sensor and the pre-created homography matrix (reference positional relationship).

Referring to FIG. 20, in an embodiment, the first projector device MPJ may identify a relocation event based on the homography matrix (reference positional relationship) and the identified coordinate values of the invisible indicators INIS. For example, upon identifying that the invisible indicators INIS are moved by a predetermined threshold or more based on the homography matrix, the first projector device MPJ may identify that the relocation event occurs.

In an embodiment, the first projector device MPJ may control the projection direction and projection range of the slave projector device SPJ based on the identified coordinate values of the invisible indicators INIS on the second projection area PJA2. In an embodiment, the identified coordinate values of the invisible indicators INIM on the second projection area PJA2 may be stored in the memory. The coordinate values of the invisible indicators INIM stored in the memory may be used to create the homography matrix, e.g., the reference of the positional relationship. The operation of controlling the projection direction and projection range based on the coordinate values of the invisible indicators INIS and the homography matrix is described in greater detail below with reference to FIGS. 20 and 21.

FIG. 20 illustrates an example where the second projection area PJA2 is moved in the arrow direction MOV. Referring to FIG. 20, the first projector device MPJ may identify a relocation event that the second projection area PJA2 is moved in the arrow direction MOV based on the coordinate values of the invisible indicators INIS and the homography matrix (reference positional relationship).

In an embodiment, upon identifying the relocation event, the first projector device MPJ may control to allow the projection area of the second projector device SPJ to be corrected to the position when generating the homography matrix based on the homography matrix. Referring to FIG. 21, the first projector device MPJ may correct the display position of the second projection area PJA2 based on the identified coordinate values of the invisible indicators INIS and the homography matrix of FIG. 20. For example, the first projector device MPJ may correct the display position to allow the second projection area PJA2 to be moved and displayed in one direction RES.

In an embodiment, the first projector device MPJ may correct the display position at a preset speed (e.g., two pixels per second or 0.1 degree per second).

The electronic device according to various embodiments of the disclosure may be one of various types of electronic devices. The electronic devices may include, for example, a display device, a portable communication device (e.g., a smartphone), a computer device, a portable multimedia device, a portable medical device, a camera, a wearable device, a home appliance, or the like. According to an embodiment of the disclosure, the electronic devices are not limited to those described above.

In an embodiment, the electronic device may include, but is not limited to, one or more processors, one or more memories, and one or more transceivers.

In an embodiment, one or more processors may include a storage and processing circuitry to support operation of the device. The storage and processing circuitry may include storage, such as non-volatile memory (e.g., flash memory, or other electrically programmable ROM configured to form a solid state drive (SSD)) or volatile memory (e.g., static or dynamic RAM). The processing circuitry in the processor may be used to control the operation of the electronic device. The processing circuitry may be based on one or more microprocessor(s), microcontroller(s), digital signal processor(s), baseband processor(s), power management section(s), audio chip(s), or application specific integrated circuitry(ies). The transceiver and memory described below are an embodiment of the processor and may be provided as functional elements performing specific functions or operations as at least part of the processor or as separate hardware components as entities performing independent functions or operations.

In an embodiment, one or more memories may include a memory area for one or more processors for storing variables used in the protocol, configuration, control, and other functions of the device, including operations corresponding to or including any one of the methods and/or procedures described as an example in the disclosure. Further, the memory may include non-volatile memory, volatile memory, or a combination thereof. Moreover, the memory may interface with a memory slot that enables insertion and removal of removable memory cards in one or more formats (e.g., SD card, Memory stick, compact flash, etc.).

In an embodiment, the transceiver may include various communication circuitry that may be included in a wireless communication module or RF module. The wireless communication module may include, for example, Wi-Fi, BT, GPS or NFC. For example, the wireless communication module may provide a wireless communication function using a radio frequency. Additionally or alternatively, the wireless communication module may include a network interface or modem for connecting the device with a network (e.g., Internet, LAN, WAN, telecommunication network, cellular network, satellite network, POTS or 5G network). The RF module may be responsible for data transmission/reception, e.g., transmitting and receiving data RF signals or invoked electronic signals. As an example, the RF module may include, e.g., a power amp module (PAM), a frequency filter, or a low noise amplifier (LNA). The RF module may further include parts (e.g., conductors or wires) for communicating radio waves in a free space upon performing wireless communication.

In an embodiment, the electronic device may include additional components. In an embodiment, various additional components may be configured depending on the type of the electronic device. For example, the additional components may include at least one of a power unit (e.g., battery), an input/output unit (I/O unit), a driving unit, and a computing unit, but are not limited thereto.

Without limitations thereto, the electronic device may include a bus in an embodiment. In an embodiment, one or more system components (e.g., a processor, a memory, or a transceivers) may be interconnected by one or more buses. In an embodiment, one or more buses may include a circuitry that interconnects or controls communication between system components.

In an embodiment, the electronic device may be implemented as a robot, vehicle, XR device, mobile device, home appliance, IoT device, terminal device for digital broadcasting, hologram device, public safety device, MTC device, medical device, fintech device, security device, climate/environment device, AI server, base station, or network node, but is not limited thereto. In an embodiment, the electronic device may be implemented as a projector device (e.g., a master projector device or a slave projector device), or a UE associated with the projector device, but is not limited thereto.

It should be appreciated that various embodiments of the present disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, or any combination thereof, and may interchangeably be used with other terms, for example, "logic," "logic block," "part," or "circuitry". A part or module may be a single integral component, or a minimum unit or part thereof, adapted to perform one or more functions. For example, according to an embodiment, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the projector device MPJ or SPJ described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A master projector device, comprising:
    a visible light sensor configured to detect a visible light wavelength band;
    an invisible light sensor configured to detect an invisible light wavelength band;
    at least one transceiver configured to communicate with a slave projector device;
    a memory including a program including at least one instruction; and
    at least one processor electrically connected with the visible light sensor, the invisible light sensor, the at least one transceiver, and the memory and configured to execute the at least one instruction of the program, wherein the processor is configured to:
    obtain first sensing information obtained through the visible light sensor,
    obtain second sensing information through the invisible light sensor,
    generate a positional relationship with the slave projector device based on the first sensing information and the second sensing information, and
    control a projection direction and projection range of the slave projector device based on the generated positional relationship and the second sensing information identified by the invisible light sensor while projecting an image stored in the memory to a projection surface.

2. The master projector device of claim 1, further comprising a projector and an emitter,
    wherein the projector is configured to project a visible light band image to a first projection area, and the emitter is configured to emit an invisible band invisible indicator to be included in the first projection area.

3. The master projector device of claim 2, wherein the processor is configured to;
    project a visible indicator to the first projection area using the projector and control the slave projector device to project a visible indicator to the second projection area,
    generate first relationship information based on positions of visible indicators identified by the visible light sensor in the first projection area and the second projection area, and
    generate second relationship information by associating a position of the invisible indicator identified by the invisible light sensor to the first relationship information in at least one of the first projection area or the second projection area, and
    wherein the second relationship information is configured as at least a portion of the positional relationship.

4. The master projector device of claim 2, wherein a field of view of the projector is set to be smaller than a field of view of the visible light sensor.

5. The master projector device of claim 2, wherein a field of view of the projector is set to be smaller than a field of view of the invisible light sensor.

6. The master projector device of claim 2, wherein the emitter is configured to emit light in a wavelength band of at least one of ultraviolet, near ultraviolet, infrared, and near infrared light.

7. The master projector device of claim 2, wherein the first sensing information includes a coordinate value regarding a plurality of visible indicators projected by the projector.

8. The master projector device of claim 2, wherein the second sensing information includes a coordinate value regarding a plurality of invisible indicators projected by the emitter.

9. The master projector device of claim 2, wherein the processor is configured to: identify an overlap area included in the first projection area using the visible light sensor; and change a grayscale in the overlap area in gradations.

10. The master projector device of claim 2, wherein the processor is configured to: identify an overlap area included in the first projection area using the visible light sensor; change a grayscale in a filling area including the overlap area into a specified grayscale value, and change grayscales in at least two areas adjacent to the overlap area in gradations outward.

11. A master projector device, comprising:
a projector configured to output a visible indicator and an image;
an emitter configured to emit an invisible indicator;
a visible light sensor configured to identify the visible indicator;
an invisible light sensor configured to identify the invisible indicator;
at least one transceiver configured to communicate with a slave projector device;
a memory including a program including at least one instruction; and
at least one processor electrically connected with the projector, the emitter, the visible light sensor, the invisible light sensor, the at least one transceiver, and the memory and configured to execute the at least one instruction of the program, wherein the processor is configured to;
identify the invisible indicator emitted to at least a partial area of a projection surface corresponding to a second field of view through the invisible light sensor having the second field of view while projecting an image stored in the memory to the projector having a first field of view, and
control a projection direction and projection range of the slave projector device based on a coordinate value of the identified invisible indicators.

12. The master projector device of claim 11, wherein the first field of view of the projector is set to be smaller than a third field of view of the visible light sensor.

13. The master projector device of claim 11, wherein the first field of view of the projector is set to be smaller than the second field of view of the invisible light sensor.

14. The master projector device of claim 11, wherein the processor is configured to:
project a visible indicator to the first projection area using the projector and control the slave projector device to project a visible indicator to the second projection area,
generate first relationship information based on positions of visible indicators identified by the visible light sensor in the first projection area and the second projection area, and
generate second relationship information by associating a position of the invisible indicator identified by the invisible light sensor to the first relationship information in at least one of the first projection area or the second projection area, and
wherein the second relationship information is configured as at least a portion of the positional relationship.

15. The master projector device of claim 11, wherein the processor is configured to control the master projector to output only the invisible indicator, or the visible indicator and the invisible indicator, while outputting the image.

* * * * *